US012142103B2

(12) United States Patent
Tietz et al.

(10) Patent No.: US 12,142,103 B2
(45) Date of Patent: Nov. 12, 2024

(54) MONITORING DURATION OF STAY AND REGION OF STAY

(71) Applicants: Mareike Tietz, Cologne (DE); Christian Kasper, Brühl (DE); Frank Langer, Troisdorf (DE)

(72) Inventors: Mareike Tietz, Cologne (DE); Christian Kasper, Brühl (DE); Frank Langer, Troisdorf (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 17/565,654

(22) Filed: Dec. 30, 2021

(65) Prior Publication Data

US 2022/0122399 A1 Apr. 21, 2022

Related U.S. Application Data

(60) Division of application No. 16/153,960, filed on Oct. 8, 2018, now Pat. No. 11,288,906, which is a (Continued)

(30) Foreign Application Priority Data

Apr. 8, 2016 (DE) ..................... 10 2016 106 514.5

(51) Int. Cl.

*G07C 9/00* (2020.01)
*G07C 9/27* (2020.01)
(Continued)

(52) U.S. Cl.

CPC ........... *G07C 9/30* (2020.01); *G07C 9/00904* (2013.01); *G07C 9/27* (2020.01); *G07C 9/28* (2020.01);
(Continued)

(58) Field of Classification Search

CPC .................. H04W 12/06; H04W 12/64; H04L 2209/56; H04L 63/0861; H04L 63/107;
(Continued)

(56) References Cited

U.S. PATENT DOCUMENTS 5,790,015 A 8/1998 Iitsuka
8,325,033 B2 * 12/2012 Feldstein ........... H04L 12/2825 340/539.18
(Continued)

FOREIGN PATENT DOCUMENTS

CN 101467185 A 6/2009
CN 201749500 U 2/2011
(Continued)

OTHER PUBLICATIONS

Qifan Pu et al., "Whole-Home Gesture Recognition Using Wireless Signals", 2013, 12 pages, University of Washington.
(Continued)

*Primary Examiner* — Dionne Pendleton
(74) *Attorney, Agent, or Firm* — Reinhart Boerner Van Deuren P.C.

(57) ABSTRACT

Embodiments of a method are disclosed. In the method, it is checked whether a person stayed in a building or part of the building for less or no longer than a predefined duration to perform an action and/or only stayed in a predefined region of a building or part of the building. The building is accessible via an entrance securable with respect to unauthorised entry. Also, embodiments of a method are disclosed in which it is checked whether a person stayed in the building for less or no longer than a predefined duration to perform an action. Embodiments of a method are also disclosed in which information to unlock or indicative of a successful unlocking of an entrance securable with respect to unauthorised entry is received, and one or a plurality of
(Continued)

signals which allow a position in the building to be deduced are provided.

12 Claims, 11 Drawing Sheets

Related U.S. Application Data continuation of application No. PCT/EP2017/058376, filed on Apr. 7, 2017.

(51) Int. Cl.
*G07C 9/28* (2020.01)
*G07C 9/30* (2020.01)
*G08B 13/00* (2006.01)
*G08B 21/22* (2006.01)

(52) U.S. Cl.
CPC ............. *G08B 13/00* (2013.01); *G08B 21/22* (2013.01); *G07C 2209/04* (2013.01); *G07C 2209/63* (2013.01)

(58) Field of Classification Search
CPC ..... H04L 67/12; H04L 9/0872; H04L 9/3231; H04L 9/3263; H04L 63/108; H04L 12/2825; G07C 9/00571; G07C 9/257; G07C 9/26; G07C 9/37; G07C 2209/04; G07C 2209/08; G07C 9/28; G07C 9/00904; G06Q 10/083; G06Q 20/3224; G06Q 20/4014; G06Q 40/00; G06Q 10/0833; G06Q 10/063112; G06Q 10/063116; G06Q 10/06316; G06F 16/2379; G06F 16/51; G08B 13/19613; G08B 13/19682; G08B 21/22; G08B 13/19608; G08B 13/19606; G08B 13/1961; G08B 25/008; G08B 13/19602; G08B 13/196; G08B 25/009; H04N 5/144; H04N 7/181; H04N 7/18; G06T 2207/30232; G06T 2207/10016; G06T 2207/30201; G06T 7/292; G06T 7/20; G06T 7/70; G06V 20/52; G06V 20/53; G06V 40/172; G06V 40/10; G06V 40/173; G06V 20/10; G06V 20/54; G06V 40/103; G06V 40/20; H04M 11/04; G16H 40/20; G16H 40/67
See application file for complete search history.

(56) References Cited

U.S. PATENT DOCUMENTS

| | | | |
|---|---|---|---|
| 9,558,604 | B2 | 1/2017 | Robertson et al. |
| 9,666,000 | B1 * | 5/2017 | Schoenfelder ......... G07C 9/257 |
| 10,235,646 | B2 * | 3/2019 | Perry ............. G06Q 10/063112 |
| 10,347,063 | B1 | 7/2019 | LaRovere et al. |
| 2007/0193834 | A1 | 8/2007 | Pai et al. |
| 2015/0077251 | A1 | 3/2015 | Cobb et al. |
| 2015/0154850 | A1 | 6/2015 | Fadell et al. |
| 2015/0221151 | A1 | 8/2015 | Bacco et al. |
| 2015/0279130 | A1 | 10/2015 | Robertson et al. |
| 2015/0310381 | A1 | 10/2015 | Lyman et al. |
| 2015/0371403 | A1 | 12/2015 | Koyama et al. |
| 2016/0343237 | A1 | 11/2016 | Herman et al. |
| 2017/0185277 | A1 * | 6/2017 | Sundermeyer ...... H04L 12/2803 |
| 2019/0303684 | A1 | 10/2019 | Khadloya et al. |

FOREIGN PATENT DOCUMENTS

| | | | |
|---|---|---|---|
| CN | 201946050 | U | 8/2011 |
| CN | 102262793 | A | 11/2011 |
| CN | 102354369 | A | 2/2012 |
| CN | 202183135 | U | 4/2012 |
| CN | 103093517 | A | 5/2013 |
| CN | 103401868 | A | 11/2013 |
| CN | 104851171 | A | 8/2015 |
| CN | 105075248 | A | 11/2015 |
| CN | 105303744 | A | 2/2016 |
| CN | 105389866 | A | 3/2016 |
| DE | 197 21 409 | A1 | 12/1998 |
| DE | 199 26 938 | A1 | 1/2000 |
| DE | 10 2014 202 637 | A1 | 8/2014 |
| DE | 10 2014 105 244 | A1 | 6/2015 |
| EP | 2 595 341 | A1 | 5/2013 |
| JP | 5226347 | B2 | 7/2013 |
| WO | WO 2014/159131 | A2 | 10/2014 |
| WO | WO 2016/137633 | A1 | 9/2016 |

OTHER PUBLICATIONS

Qingchao Chen et al., “Indoor target tracking using high doppler resolution passive Wi-Fi radar”, 2015, 5 pages, Department of Electronic and Electrical Engineering, University College London, London, UK.

* cited by examiner

MONITORING DURATION OF STAY AND REGION OF STAY

CROSS-REFERENCE TO RELATED PATENT APPLICATIONS

This patent application is a divisional of co-pending U.S. patent application Ser. No. 16/153,960, filed Oct. 8, 2018, which is a continuation of PCT/EP2017/058376, filed Apr. 7, 2017, which claims priority to German Application No. 10 2016 106 514.5, filed Apr. 8, 2016, the entire teachings and disclosure of which are incorporated herein by reference thereto.

FIELD OF THE INVENTION

The invention relates to, inter alia, methods, apparatus, systems and programs that serve to monitor in particular the duration of stay and the region of stay when a person performs an action, for example when a delivery agent delivers or collects a shipment.

BACKGROUND OF THE INVENTION

There is often the requirement for a resident of a house or an apartment to be at home as entry to the house or to the apartment is necessary. This may be the case, for example, when a shipment is supposed to be accepted or when tradespeople require entry to the house or to the apartment, for example, to perform repairs or to read the heating system. Not least because of the ever increasing mobility of the population, it is, however, increasingly difficult to encounter individuals at home, in particular during normal business hours in order to be able to perform the listed services.

In the area of delivery of shipments, there are indeed solutions which manage without the presence of the corresponding resident. For example, shipments can be delivered to neighbours. However, the effort and time requirement both for the delivery agent and for the recipient, who now has to collect the shipment from the neighbour, may be increased. Alternatively, it is possible for shipments to be delivered to a parcel machine; however, this also requires the recipient to collect the shipment there. This may, however, also increase the effort for the recipient and reduce comfort.

Therefore, there is an increase in the need, even without the presence of the respective person, to be able to deliver shipments directly to the recipient or to be able to collect shipments from the sender, both on the side of the sender or recipient and also on the side of the delivery agent. The individuals, for whom the corresponding service is supposed to be performed, call for greater comfort, while the delivery agents would like to avoid wasted trips as much as possible for reasons of profitability.

Even if the residents were to grant the service providers entry to their own house or to their own apartment even in their absence (for example via a third party or by means of a second key), it is then still problematic as the resident requires a degree of certainty that the service providers obtain entry only to perform their service.

BRIEF DESCRIPTION OF A NUMBER OF EXEMPLARY EMBODIMENTS OF THE INVENTION

Different embodiments of the invention enable the services to be performed by third parties even if the responsible person (for example the resident of the house or the apartment) is not present. Different embodiments of the invention can shape and further develop in particular the delivery or the collection of shipments such that shipments can be securely delivered and/or collected comfortably for the customer.

According to a first aspect, an exemplary method performed by at least one apparatus is disclosed, the method comprising:

- Checking whether a person, in order to perform an action, stayed in a building or part of the building for less or no longer than a predefined duration and/or only stayed in a predefined region of a building or part of the building, wherein the building or the part of the building is accessible via an entrance securable with respect to unauthorised entry.

According to a second aspect, an exemplary method performed by at least one apparatus is disclosed, the method comprising:

- Checking whether a person, in order to perform an action, stayed in a building or part of the building for less or no longer than a predefined duration, wherein the building or the part of the building is accessible via an entrance securable with respect to unauthorised entry.

According to a third aspect, an exemplary method performed by at least one apparatus is disclosed, the method comprising:

- Receiving information to unlock or indicative of a successful unlocking of an entrance securable with respect to unauthorised entry, via which a building or part of the building is accessible; and
- Providing one or a plurality of signals which allow a position in the building or part of the building to be deduced.

An exemplary apparatus comprises means for carrying out one or a plurality of the exemplary methods according to the different aspects or is configured to carry them out.

An additional exemplary apparatus comprises at least one processor and at least one memory, a program comprising program instructions being stored in the memory, the memory and the program being configured to at least prompt, using the processor, the apparatus to carry out one or a plurality of the exemplary methods according to the different aspects when the program is executed on the processor. A processor can be understood to mean for example a control unit, a microprocessor, a microcontrol unit such as a microcontroller, a digital signal processor (DSP), an application-specific integrated circuit (ASIC) or a field programmable gate array (FPGA).

For example, an exemplary apparatus further comprises means to store information such as a program memory and/or a main memory. For example, an exemplary apparatus according to the invention further comprises means to receive and/or to send information via a network such as a network interface. For example, exemplary apparatuses according to the invention are connected and/or connectable to one another via one or a plurality of networks.

An exemplary apparatus according to the first, second or third aspect is for example a data processing system which is configured in terms of software and/or hardware to be able to carry out the respective steps of an exemplary method according to the corresponding aspect. Examples of a data processing system are a computer, a desktop computer, a server, a thinclient and/or a portable computer, such as a laptop computer, a tablet computer, a wearable, a personal digital assistant or a smartphone.

An exemplary apparatus according to the first aspect (also referred to as first apparatus) for example is or comprises a portable device or a part thereof. A portable device is in particular understood as a device weighing less than 5 kg, in particular less than 1 kg. The apparatus is for example an end device. The portable device is for example a computer, a laptop, a tablet, a mobile telephone, a PDA, a smartwatch or a hand scanner. An apparatus according to the first aspect is for example configured to send and/or receive signals according to the IEEE-802.11-Standard (WLAN), the Bluetooth (low energy) standard and/or the NFC standard.

An exemplary apparatus according to the second aspect (also referred to as second apparatus) for example is or comprises a server or a part thereof. An apparatus according to the second aspect for example comprises a database or can exchange data therewith.

An exemplary apparatus according to the third aspect (also referred to as third apparatus) for example is or comprises an electronic lock, a beacon or a part thereof. A beacon is in particular understood as a device which can repeatedly (in particular periodically) emit (identification) signals (broadcasting), in particular based on Bluetooth technology. These signals can then be received by (portable) electronic devices located in the vicinity. A Bluetooth beacon is, for example, a Bluetooth beacon, which supports the Bluetooth low energy mode, or a Bluetooth low energy beacon. A Bluetooth beacon can, for example, be any Bluetooth beacon which corresponds to current or future standards. Alternatively or additionally, a beacon can also receive corresponding signals. However, it is understood that other types of beacons can also be used, for example devices which send ultra-wideband (UWB) signals, ultrasonic signals or other radio signals. A beacon can for example be an independent device or be integrated into another device or arranged thereon.

An electronic lock is in particular understood as a lock that functions based on electric power. An electronic lock can in particular be based on an authentication and can be actuated (i.e. in particular released, unlocked, opened or secured, locked, closed) without the use of a physical key. The authentication takes place, for example, based on access authorisation information such as a numeric code, a password, a passphrase or biometric information. The access authorisation information can also be stored in a portable device (for example an apparatus according to the first aspect) and be transferred to the electronic lock by means of infrared, Bluetooth, RFID and/or NFC technology. An exemplary electronic lock can in particular have the functionality of a beacon, as previously described, or comprise such.

For example, an exemplary system according to the invention comprises one or a plurality of apparatuses configured to carry out or comprising means to carry out one or a plurality of the exemplary methods according to the different aspects.

A further exemplary system according to the invention comprises

- one or a plurality of apparatuses configured to carry out or comprising means to carry out the method according to the first aspect;
- one or a plurality of apparatuses configured to carry out or comprising means to carry out the method according to the second aspect; and/or
- one or a plurality of apparatuses configured to carry out or comprising means to carry out the method according to the third aspect.

An exemplary program according to the invention comprises, according to the invention, program instructions in order to at least partially carry out one or a plurality of the exemplary methods according to the different aspects when the program is executed on a processor.

An exemplary program according to the invention can be stored in or on a computer-readable storage medium which contains one or a plurality of exemplary programs and e.g. is designed as a magnetic, electric, electro-magnetic, optical and/or another storage medium. Such a computer-readable storage medium is preferably physical (i.e. "touchable"), for example it is designed as a data carrier apparatus. Such a data carrier apparatus is for example portable or permanently installed in an apparatus. Examples of such a data carrier apparatus are volatile or non-volatile memories with random access (RAM) such as e.g. NOR flash memories or with sequential access such as NAND flash memories and/or memories with read-only access (ROM) or write-read access. Computer-readable should for example be understood such that the memory medium can be read and/or written on by a computer or a data processing system, for example a processor.

In relation to the different aspects of the invention, the person is, for example, a service provider, in particular a delivery agent or supplier. For example, the action to be performed by the person is a service which in particular requires entry to the building or part of the building. For example, the action is to deliver or collect a shipment or a delivery.

The building is, for example, a (residential) house, in particular a single-family house or an apartment building. It is also possible that the building is an office building, a warehouse or a garage. Accordingly, a part of the building may be one part of such a building. A part of the building may in particular be a separate unit, such as an apartment or a stairwell of a building, for example of an apartment building. A part of the building may also be a room or an office of a building. A predefined region of a building or a part of the building may accordingly be a section of the building or a part of the building, for example comprising one or a plurality of rooms or only one part of a room. For example, the predefined region can be or comprise the entrance region of a building or part of the building. For example, the predefined region is or comprises a region of the building or part of the building closer to the entrance (for example closer to the door). For example, a predefined region is a two or three-dimensional region of the building or part of the building. For example, the predefined part of the building is a few square metres. The building, the part of the building and/or the predefined region can for example be non-public (such as a residential house, an apartment or a part thereof) or partially-public (for example a stairwell of an apartment building). By checking whether the person only stayed in a predefined region of a building or part of the building, it can be ensured that a person stays only in the region in which they must stay in order to perform the action.

A predefined duration is, for example, a predefined duration in the region of hours, minutes or seconds. For example, the predefined duration is between a minimum value and a maximum value, for example the predefined duration is within a range of 1 second to 10 minutes. By checking whether a person stayed in a building or part of the building for less or no longer than a predefined duration to perform an action, it can be ensured that a person stays in the building or part of the building only for as long as is necessary in order to perform the action.

The predefined duration according to the first aspect and according to the second aspect can be of the same or different durations. For example, the predefined duration according to the first aspect is shorter than the predefined duration according to the second aspect. For example, the predefined duration according to the first aspect is the same as the predefined duration according to the second aspect. For example, the predefined duration according to the first aspect is in the range of seconds (for example 15 seconds or 60 seconds). For example, the predefined duration according to the second aspect is in the range of minutes (for example 1 minute or 5 minutes).

In order to perform the action, the person can enter the building or the part of the building in particular via the entrance securable with respect to unauthorised entry. The entrance is preferably a door, for example an apartment door, a house door or a lift door. It is also conceivable for the entrance to be a gate. The entrance is, for example, secured such that the entrance can be closed, for example by means of an electronic lock, in particular as described in relation to an apparatus according to the third aspect. For example, the entrance can in this case be opened only by a button actuation (for example pressing down the handle). If a button is, for example, not provided on the outside, the entrance can be opened only from the inside, but not from the outside. The entrance is also, for example, secured by the entrance being locked (also barred, shut or sealed) by means of the (electronic) lock. For example, the entrance is then also secured by a rigid bar which engages into a suitable recess. In particular, the entrance then cannot be opened by a mere button actuation, but must firstly be unlocked.

Checking whether a person stayed in a building or part of the building for less or no longer than a predefined duration to perform an action and checking whether the person only stayed in a predefined region of a building or part of the building, is also understood as the checking taking place using an apparatus, in the case of which it can be assumed that the person carries the apparatus with them. In other words, owing to the association of the person with the corresponding apparatus, it can be assumed that the checking results determined in relation to the corresponding apparatus can be transferred to the person associated with the apparatus. In this case, it can, for example, be an apparatus according to the first aspect.

In relation to the different aspects, providing (information) can in particular consist of or comprise sending (the information). Receiving (information) can in particular consist of or comprise receiving (the information). Providing, receiving, sending and/or obtaining can in particular take place via a wired or a wireless connection to a communications system, for example via a communications interface. Examples of communications systems are a local area network (LAN), a wide area network (WAN), a wireless network (for example according to the IEEE-802.11 standard, the Bluetooth (LE) standard and/or the NFC standard), a wired network, a mobile phone network, a telephone network and/or the internet.

According to one exemplary configuration of the method according to the first aspect, the method further comprises:

Requesting access authorisation information to allow entry of the person in order to perform the action into the building or the part of the building via the entrance securable with respect to unauthorised entry.

The access authorisation information can in particular allow the person to unlock the secured entrance and therefore gain entry to the building or part of the building. The request can in particular take place via encrypted communication. For example, the request is triggered by the person by means of a user input to an apparatus (for example according to the first aspect). The access authorisation information is for example requested by an apparatus according to the second aspect (for example a remote server).

Accordingly, according to an exemplary configuration of the method according to the second aspect, the method further comprises:

Receiving a request for access authorisation information to allow entry of the person in order to perform the action into the building or the part of the building via the entrance securable with respect to unauthorised entry.

As described, the request is in particular sent from an apparatus according to the first aspect, in particular via encrypted communication.

According to one exemplary configuration of the method according to the first aspect, the method further comprises:

Determining position information representative of the position of the person;

Providing the determined position information representative of the position of the person.

For example, the position information is determined based on a communications network, for example based on a wireless network, such as a mobile phone network (for example a GSM network). For example, the position information is determined based on a global navigation satellite system (for example NAVSTAR GPS, GLONASS or Galileo). To this end, an apparatus according to the first aspect can for example receive and evaluate corresponding signals of the system or the network. Since it can be assumed that the person carries an apparatus according to the first aspect with them, the determined position information is representative of the position of the person. The determined position information is then for example provided and in particular sent to an apparatus according to the second aspect. For example, the request for access authorisation information comprises sending the determined position information. This allows, for example, a server-side plausibility check, in particular whether the person requesting the access authorisation information is actually in front of the corresponding building or part of the building, for which the access authorisation information is requested.

Accordingly, according to an exemplary configuration of the method according to the second aspect, the method further comprises:

Receiving position information representative of the position of the person;

Checking the plausibility of the received position information representative of the position of the person and the requested access authorisation information.

As already mentioned, the position information received (received for example by an apparatus according to the first aspect) allows the plausibility to be checked. If for example it is determined based on the received position information representative of the position of the person that the person requesting the access authorisation information is actually in front of the corresponding building or part of the building, for which the access authorisation information is requested, the plausibility check is successful. In the case of a positive plausibility check, access authorisation information is in particular provided.

According to an exemplary configuration of the method according to the second aspect, the method therefore also comprises:

Providing access authorisation information to allow entry of the person in order to perform the action into the building or the part of the building via the entrance securable with respect to unauthorised entry.

The access authorisation information can in particular be sent to an apparatus according to the first aspect. For example, the access authorisation information for the action to be performed or an authorisation to provide the access authorisation information for the action to be performed is stored in a data memory of an apparatus according to the second aspect. For example, an authorisation is granted for this purpose (for example by email, SMS or push message). For example, the access authorisation information for the action to be performed or an authorisation to provide the access authorisation information for the action to be performed is (manually) unlocked when the request for access authorisation information is received. Accordingly, the method according to the second aspect can comprise checking whether the access authorisation information for the action to be performed or an authorisation to provide the access authorisation information for the action to be performed is present.

According to one exemplary configuration of the method according to the first aspect, the method further comprises:

Receiving access authorisation information to allow entry of the person in order to perform the action into the building or the part of the building via the entrance securable with respect to unauthorised entry.

The access authorisation information allows the person entry to the building or part of the building. For example, the access authorisation information allows releasing of the entrance, for example by unbolting and/or unlocking an electronic lock (for example according to the third aspect) of the entrance. The access authorisation information for example comprises a (digital) authentication feature. For example, the access authorisation information comprises a digital certificate or is based at least partially thereon. For example, the access authorisation information comprises a password or a passcode.

According to an exemplary configuration of the method according to the first aspect, the received access authorisation information to allow entry of the person in order to perform the action into the building or the part of the building via the entrance securable with respect to unauthorised entry comprises information representative of the predefined duration.

Information representative of the predefined duration comprises for example data from which the predefined duration can be determined or which indicates the duration (for example in seconds). If the predefined duration is determined (only) by the access authorisation information received, the predefined duration can vary and in particular can be determined dependent on the situation, for example can be transferred individually to the respective person for each action to be performed.

According to one exemplary configuration of the method according to the first aspect, the method further comprises:

Providing access authorisation information based at least on the received access authorisation information to allow entry of the person in order to perform the action into the building or the part of the building via the entrance securable with respect to unauthorised entry.

The access authorisation information provided can for example correspond to or comprise the access authorisation information received. For example, the access authorisation information is sent to an apparatus according to the third aspect (for example an electronic lock). The access authorisation information is for example transferred wirelessly by means of radio. As already mentioned, the access authorisation information can comprise a digital certificate or be based at least partially thereon. The access authorisation information can also be provided such that the access authorisation information (for example a password or a passcode) is displayed to the person by an apparatus according to the first aspect such that the person can then unlock an electronic lock of the entrance. The access authorisation information is preferably usable only once. The access authorisation information is for example usable only in a certain time period.

According to an exemplary configuration of the method according to the first aspect, providing the access authorisation information comprises providing information representative of the predefined duration. For example, data that are representative of the predefined duration are sent by an apparatus according to the first aspect to an apparatus according to the third aspect. An apparatus according to the third aspect (for example an electronic lock or a beacon) can then send signals (repeatedly or periodically) for the predefined duration which allow for example a position of an apparatus according to the first aspect (and therefore of the person) in the building or part of the building to be deduced. As a result, during the predefined duration, checking whether the person only stayed in a predefined region of a building or part of the building in order to perform the action can be supported.

According to an exemplary configuration of the method according to the first aspect, the predefined duration is determined based on action-specific information in relation to the respective action to be performed and/or based on empirical values in relation to actions already performed.

For example, the predefined duration is determined based on action-specific information in relation to the respective action to be performed and/or based on empirical values in relation to actions already performed in the context of an exemplary configuration of the method according to the second aspect.

In this respect, according to an exemplary configuration of the method according to the second aspect, the method further comprises:

Determining the predefined duration based on action-specific information in relation to the respective action to be performed and/or based on empirical values in relation to actions already performed.

Action-specific information is understood as information that is specific to the action to be specifically performed and in particular influences or can influence a required duration of stay of the person in the building or part of the building. If the action to be performed is for example a delivery or collection of one or a plurality of shipments (for example packages), then the action-specific information can for example be information concerning the number of the shipments to be delivered or collected. A larger number of shipments can then increase the predefined duration. The action-specific information can also relate to the building or the part of the building in which the action must be performed. For example, the position (for example floor) of the part of the building (for example the apartment) can influence the predefined duration since for example delivery or collection of one (or a plurality of) shipment(s) on a floor located further above can require more time. Alternatively or additionally, the predefined duration can be determined based on empirical values in relation to actions already performed. For example, information concerning actions of the same type to be performed (for example delivery of a certain number of shipments) can be taken into account. For example, information concerning actions performed in the same or in a similar building or part of the building (for example a delivery to the same apartment or an apartment on the same floor) can be taken into account.

According to one exemplary configuration of the method according to the first aspect, the method further comprises:

Receiving information indicative of a successful unlocking of the entrance securable with respect to unauthorised entry.

As already mentioned, releasing can be unlocking, unbolting and/or opening the entrance (i.e. in particular an electronic lock). Information indicative of a successful unlocking can for example be received as a result of a corresponding signal being received (in particular by an apparatus according to the third aspect, for example an electronic lock).

In this respect, according to an exemplary configuration of the method according to the third aspect, the method can also comprise:

Providing information indicative of a successful unlocking of the entrance securable with respect to unauthorised entry.

An apparatus according to the first aspect, which obtains the information indicative of a successful unlocking, can in turn provide this information, for example send it to an apparatus according to the second aspect. In this case, it can be taken into account which communication connections are available, i.e. for example whether the corresponding apparatus according to the first aspect has access to the internet (the information can then for example be sent via the internet) or not (the information can for example be sent via the GSM mobile phone network, for example by means of SMS).

Accordingly, according to an exemplary configuration of the method according to the second aspect, the method can also comprise:

Receiving information indicative of a successful unlocking of the entrance securable with respect to unauthorised entry.

The information indicative of a successful unlocking of the entrance securable with respect to unauthorised entry can be sent, as described, by an apparatus according to the first aspect. Alternatively, it is also possible for the information to be sent by an apparatus according to the third aspect.

According to one exemplary configuration of the method according to the first aspect, the method further comprises:

Determining the beginning of a duration of stay of the person in the building or part of the building based at least on the received information indicative of a successful unlocking of the entrance securable with respect to unauthorised entry.

In this respect, according to an exemplary configuration of the method according to the second aspect, the method further comprises:

Determining the beginning of a duration of stay of the person in the building or part of the building based at least on providing access authorisation information to allow entry of the person in order to perform the action into the building or the part of the building via the entrance securable with respect to unauthorised entry or based at least on obtaining information indicative of a successful unlocking of the entrance securable with respect to unauthorised entry.

The received information indicative of successful unlocking of the entrance securable with respect to unauthorised entry can be used to determine the beginning of the duration of stay of the person in the building or part of the building. For example, the beginning of the duration of stay corresponds to the time of the successful unlocking or the time of obtaining the information indicative thereof. For example, a timer is initialised (for example started and/or reset) which is representative of the duration of stay of the person in the building or part of the building. The timer can for example run forwards. Checking whether the duration of stay of the person in the building or part of the building is less or no longer than a predefined duration can then for example comprise checking whether the timer is less than the predefined duration. Alternatively, it is conceivable for the timer to run backwards (for example beginning with the predefined duration). Checking whether the duration of stay of the person in the building or part of the building is less or no longer than a predefined duration can then for example comprise checking whether the timer has run out.

According to an exemplary configuration of the method according to the second aspect, the method therefore also comprises:

Providing information indicative of the beginning of the action to be performed when the access authorisation information to allow entry of the person in order to perform the action into the building or the part of the building via the entrance securable with respect to unauthorised entry was provided or when the information indicative of a successful unlocking of the entrance securable with respect to unauthorised entry was received.

Further individuals (for example an administrator or a resident of the building or the part of the building) can hereby obtain the information that the action to be performed has begun. It is also possible to provide the information of an intruder alarm system or a smart home system so that for example a false alarm by the intruder alarm system can be avoided.

According to one exemplary configuration of the method according to the first aspect, the method further comprises:

Receiving one or a plurality of signals which allow a position in the building or part of the building to be deduced; checking whether the person only stayed in the predefined region of the building or part of the building being based at least on the one or the plurality of signals received.

The one or the plurality of signal(s) can for example be (a) signal(s) according to the IEEE-802.11 standard, (a) signal(s) according to the Bluetooth (LE) standard, (an) RFID signal(s) (for example according to the NFC standard) and/or (a) signal(s) of a communications network (for example of a mobile phone network). The signal(s) can for example be sent from one (or a plurality) of apparatus(s) according to the third aspect (for example an electronic lock and/or one or a plurality of (internet-capable) beacon(s)). To name a further example, the signal(s) received can for example also be (a) signal(s) based on the earth's magnetic field (for example representative of the strength and/or the direction of the earth's magnetic field) which allow a position to be deduced. Signals based on the earth's magnetic field can also serve to determine whether the person has entered the building.

Since the signal(s) allow the position in the building or part of the building to be deduced, in particular determining the position of an apparatus according to the first aspect (and therefore determining the position of the person performing the action) is possible. The signal(s) are thus in particular at least partially specific to or characteristic of (for example in relation to the signal strength) the position at which the signal(s) is/are received. In this case, the signal(s) can for example allow a position relative to the building, the part of the building or the earth's surface or a position relative to a sender of the signals to be determined. For example, a position in the building or part of the building can be deduced relative to the predefined region, in particular whether the position is located in the predefined region or outside of the predefined region.

The building, a part of the building or a part thereof may have been measured beforehand by a user or resident in relation to the signal(s), for example by the signal(s) being measured at different (known) locations. For example, a (digital) map (for example in the form of a so-called radio map based on radio signals or the earth's magnetic field) was created, based on which a position in the building or part of the building can be deduced.

For example, a region, in which the signal(s) (for example an electronic door lock) are supposed to be received (for example are above a threshold value), define at least one part of the predefined region in which the person is allowed to stay in order to perform the action (permitted region). For example, a region, in which the signal(s) are not supposed to be received (for example are below a threshold value), define at least one part of the region in which the person is not allowed to stay in order to perform the action (prohibited region). It is also conceivable for a region in which the signal(s) (for example a beacon) are supposed to be received (for example are above a threshold value) defines at least one part of the region in which the person is not allowed to stay in order to perform the action (prohibited region).

For example, a plurality of apparatuses (in particular according to the third aspect) are provided which can send corresponding signals, for example an electric door lock and one or a plurality of beacons.

In this respect, the one or the plurality of signal(s), which allow a position in the building or part of the building to be deduced, in particular by a method according to the third aspect, can be provided, for example after receiving information to unlock or indicative of a successful unlocking of an entrance securable with respect to unauthorised entry, via which a building or part of the building is accessible.

For example, the signal(s) are provided only for the predefined duration. This means after the expiry of the predefined duration, signal(s) are preferably no longer provided.

As already described, according to an exemplary configuration of the method according to the third aspect, a predefined region of the building or part of the building, in which a person is allowed to stay to perform an action, can at least partially be defined by providing the one or the plurality of signals.

According to one exemplary configuration of the method according to the first aspect, the method further comprises:

Checking whether the predefined duration has elapsed.

Also according to an exemplary configuration of the method according to the second aspect, the method further comprises:

Checking whether the predefined duration has elapsed.

Based on checking whether the predefined duration has elapsed, checking whether the person stayed in the building or part of the building for less or no longer than a predefined duration to perform an action can take place. To this end, a beginning of the duration of stay of the person in the building or part of the building was for example firstly determined, for example triggered by an unlocking of the entrance secured with respect to unauthorised entry. If for example it is determined that the predefined duration has elapsed since the relevant event, it can be checked whether the person has left the building or the part of the building and/or the action was successfully performed. It is also conceivable for it to be checked whether the person has left the building or the part of the building and/or the action was successfully performed before it is checked whether the predefined duration has elapsed since the relevant event.

As already mentioned, the predefined duration according to the first aspect and the predefined duration according to the second aspect are preferably independent of one another and are in particular different.

According to one exemplary configuration of the method according to the first aspect, the method further comprises:

Receiving sensor data from one or a plurality of sensors, the sensor data being representative of a behaviour of the person;

Checking whether based at least on the sensor data, the person deviates from a predefined behaviour.

A sensor of the one or the plurality of sensors is for example a motion sensor, acceleration sensor, a magnetic field sensor, a gyroscope, a magnetometer, an infrared sensor and/or a fingerprint sensor. The sensor(s) are for example part of an apparatus, in particular according to the first aspect. Alternatively, the sensors can also be mobile or stationary sensors of other apparatuses. Since the sensor data are representative of a behaviour of the person, the sensor data can be used to check whether the person performing the action deviates from a predefined behaviour. The sensor data can according to an exemplary configuration of the method according to the first aspect in particular be representative of a movement of the person. For example, a pattern check is performed based on the sensor data. A pattern may be indicative of a deviation of the person from a predefined behaviour.

For example, based on one or a plurality of sensors, it is checked whether no movement or an excessively small movement of the respective apparatus takes place, from which it can for example be deduced that the person has put down the apparatus. Alternatively or additionally, it can be checked whether the person carries the respective apparatus with them and/or holds it in their hand. For example, it is verified by means of a fingerprint sensor (for example periodically) whether a finger of the person is recognised. For example, based on one or a plurality of sensors, it is checked whether the motion width of the person corresponds to a predefined behaviour, for example is less or no more than a predefined threshold (for example less than 2 metres). For example, based on one or a plurality of sensors, it is checked whether very quick movements for example (short) shaking movements of the respective apparatus take place, from which it can for example be deduced that the person is running. For example, based on one or a plurality of sensors, it is checked whether the respective apparatus is thrown. For example, based on one or a plurality of sensors, it is checked whether the respective apparatus is moved (excessively) regularly (for example swung), from which a feigned (false) movement can for example be deduced. These cases correspond for example to a deviation from a predefined behaviour. It can thus in particular be ensured that the person behaves as desired (i.e. carries the apparatus with them, does not run etc.).

It is also possible for example to receive on one of the apparatuses according to the first aspect, radio signals, in particular according to the IEEE-802.11 standard, the Bluetooth standard or the NFC standard and to draw a conclusion for example concerning behaviour, in particular a movement of the person from these signals. To this end, for example the strength and/or change of the signals is taken into account, which for example can be influenced and/or caused by shadowing, reflection and/or the Doppler effect. For example, to this end, one or a plurality of object density(ies) (in the vicinity) can be measured which are representative of one or a plurality of individuals. It is also possible to determine from these signals or their change, properties and/or changes in the environment (including individuals), for example the number or a change in the number of the individuals. If for example a reduction of an object density is determined, a conclusion can be drawn concerning a second individual leaving. Exemplary functional principles are described in "Whole-Home Gesture Recognition Using Wireless Signals", Qifan Pu, Sidhant Gupta, Shyamnath Gollakota, and Shwetak Patel, University of Washington and in "Indoor target tracking using high doppler resolution passive Wi-Fi radar", Q. Chen; Dept of Electron. & Electr. Eng., Univ. Coll. London, London, UK; B. Tan; K. Woodbridge; K. Chetty, both of which are incorporated by reference in their entireties herein.

If it is determined that the person deviates from a predefined behaviour, one of the apparatuses according to the first aspect can for example emit an indication (in particular optical and/or acoustic) to the person. Additionally or alternatively, the predefined duration can be shortened as an additional measure, for example by running a timer faster.

It is also possible, based on the sensor data to check whether the person only stayed in a predefined region of a building or part of the building in order to perform the action. For example, a motion detector (for example a PIR sensor) placed in the building or part of the building can be used for this purpose. A movement outside of the predefined region can be detected by the motion detector. The sensor data can then be evaluated by the sensor itself or by an apparatus according to the first and/or second aspect.

A motion detector of this type is for example then activated when an electronic door lock of the entrance is unlocked. For example, the electronic door lock sends (for example by means of Bluetooth) an activation signal to an alarm unit comprising the motion detector (as described further below). In this case, the electronic door lock, for example, can be configured such that the activation signal is then only sent when a person requiring monitoring (for example service providers in contrast to trustworthy friends and family) unlocks the electronic lock.

In this respect, both in combination with, but also independently of the other aspects and according to an independent aspect, a method, performed by at least one apparatus, is disclosed, the method comprising:

Receiving information to unlock an entrance securable with respect to unauthorised entry by a person, via which a building or a part of the building is accessible, Providing an activation signal dependent on the person.

For example, the at least one apparatus is or comprises an electronic door lock. For example, the person unlocks the door lock by means of a portable apparatus (for example a smartphone). For example, the activation signal is a radio signal, in particular a Bluetooth signal. For example, the activation signal is sent by means of a Bluetooth transmitter. For example, an activation signal is provided dependent on whether the person belongs to a predefined group of persons. For example, an activation signal is provided when the person is a person requiring monitoring, for example belonging to one or a plurality of predefined groups of persons (for example service providers). For example, an activation signal is not provided or an activation signal is prohibited from being provided when the person is a trustworthy person, for example belonging to one or a plurality of predefined groups of persons (for example friends, acquaintances, family). For example, the information to unlock comprises information concerning the person or group of persons to which the person belongs. For example, the resident of the building or part of the building defined the corresponding groups of persons. For example, the one or plurality of predefined groups of persons are stored by the apparatus (for example the electronic door lock).

For example, the activation signal is received by an alarm unit. For example, based on the activation signal, the alarm unit or parts thereof is activated. For example, the alarm unit is placed in the building or part of the building. For example, the alarm unit comprises a Bluetooth receiver, a motion detector (in particular a PIR sensor), a light barrier, a camera unit, a WLAN unit, a battery and/or a microcontroller. For example, at least one motion detector of the alarm unit is activated by the activation signal. If the alarm unit comprises a camera unit (for example for still or movable images), it can also be switched on by the activation signal. For example, data of the camera unit (for example a video stream) are sent preferably encrypted by means of the WLAN unit to a server (for example an access management platform). For example, (only) the resident of the house can access the data. For example, the motion detector is designed to measure the penetration depth of the person into the building or the part of the building. For example, the alarm unit checks whether the person is in a permitted region. For example, the alarm unit checks whether the person is in a prohibited region. For example, the alarm unit sends (for example by means of SMS, call, email or instant message) a notification, if it is determined that the person is in a prohibited region. For example, a server (for example the access management platform) stores data representative of the incident.

For example, the method further comprises receiving information to secure the entrance by the person and providing a deactivation signal. For example, the deactivation signal is a radio signal, in particular a Bluetooth signal. For example, the deactivation signal is received by the alarm unit. For example, the deactivation signal deactivates the alarm unit or parts thereof. For example, the alarm unit or parts thereof is deactivated when the motion detector does not determine a movement during a defined time.

According to an exemplary configuration of the method according to the first aspect, checking whether, based at least on the sensor data, the person deviates from a predefined behaviour, is based at least on a rule-based algorithm and/or an artificial neuronal network.

An artificial neuronal network (also ANN) is understood as networks made of artificial neurons. For example, single-layer, multi-layer and/or recurrent networks. For example, sensor data from a number of apparatuses (for example according to the first aspect) are used which are associated with a number of individuals in order to train the neuronal network so that a trained neuronal network is received. The sensor data of a number of apparatuses can also be used and/or in order to determine the rules of the algorithm.

According to one exemplary configuration of the method according to the first aspect, the method further comprises:

Checking whether the person has left the building or the part of the building.

Checking whether the person has left the building or the part of the building can help to increase security. It can for example be deduced from this whether the action to be performed has ended and/or was successfully performed. For example, repeated or periodic checking whether the person has left the building or the part of the building takes place. For example, checking whether the person has left the building or the part of the building (at least) takes place when the predefined time has elapsed. For example, checking whether the person has left the building or the part of the building (at least) takes place when no (further) signal is received which allows a position in the building or part of the building to be deduced. For example, checking whether the person has left the building or the part of the building (at least) takes place when, based on the signals, which allow a position in the building or part of the building to be deduced, it is determined that the person stayed not only in the predefined region.

According to an exemplary configuration of the method according to the first aspect checking whether the person has left the building or the part of the building, is based at least on checking whether the entrance of the building or part of the building securable against the unauthorised entry is secured from the outside. The person leaving the building or part of the building can be reliably deduced by way of an entrance secured from the outside (for example an electronic lock sealed or locked from the outside). For example, information indicative of securing of the entrance is received from the outside. For example, this information can be sent from an electronic lock as the apparatus according to the third aspect By checking whether corresponding information was received, it can be checked whether the person has left the building or the part of the building.

In this respect, according to an exemplary configuration of the method according to the third aspect, the method can also comprise:

Receiving information to secure or indicative of successful securing of the entrance securable with respect to unauthorised entry.

For example, information to unlock was sent to an electronic lock (for example by an apparatus according to the first aspect when the person leaves the building or the part of the building) so that the entrance is secured (from the outside) by the electronic lock. For example, information indicative of a successful securing can also be sent to a beacon and received by the beacon. This information can then be in turn provided by the electronic lock or by the beacon.

According to an exemplary configuration of the method according to the third aspect, the method can therefore also comprise:

Providing information indicative of successful securing of the entrance securable with respect to unauthorised entry.

According to an exemplary configuration of the method according to the first aspect checking whether the person has left the building or the part of the building, is based at least on checking whether the position of the person is located outside of the building or part of the building. For example, information indicative of a position of the person outside of the building or part of the building is received. For example, position information representative of the position of the person is received. As already mentioned, the position information can be determined based on a communications network such as a mobile phone network (for example a GSM network) or based on a global navigation satellite system. Alternatively or additionally, information indicative of an activity of the person at a location outside of the building or the part of the building can also be received. For example, information indicative of an unlocking of an entrance of another building or part of the building securable with respect to unauthorised entry is received. It can be concluded from this that the position of the person is located outside of the building or part of the building.

According to an exemplary configuration of the method according to the first aspect, checking whether the person has left the building or the part of the building takes place when it is determined that the predefined duration has elapsed. Additionally or alternatively, checking whether the person has left the building or the part of the building can also take place before the predefined duration has elapsed. Additionally or alternatively, checking whether the person has left the building or the part of the building can take place when it is determined that the person stayed not only in the predefined region.

It is essentially possible for a notification to be provided if it is determined that the person stayed in a building or part of the building for not less or longer than a predefined duration in order to perform the action and/or did not only stay in a predefined region of the building or part of the building.

According to an exemplary configuration of the method according to the first aspect, a notification is in particular provided if it is determined that the person has not left the building or the part of the building, in particular after elapsing of the predefined duration. The notification can for example be an alarm signal. For example, it is not discernible (for example not optically or acoustically discernible) to the person (the user of an apparatus according to the first aspect) that a notification is provided. As a result, the danger is reduced of an apparatus according to the first aspect being deactivated or switched off. In this respect, the notification can also be considered a silent alarm.

Since checking whether the person has left the building or the part of the building can be based in particular on checking whether the entrance of the building or part of the building securable with respect to unauthorised access is secured from the outside, a notification is in particular provided when it is determined that the entrance of the building or part of the building securable with respect to unauthorised access is not secured from the outside.

The notification can in particular be sent to an apparatus according to the second aspect. It is preferably firstly checked which communications connection (for example an internet connection or a mobile phone connection) is available before the notification is sent via a communications connection that is available (for example via the internet or via the GSM mobile phone network by means of SMS).

Accordingly, according to an exemplary configuration of the method according to the second aspect, the method further comprises:

Receiving a notification that the person stayed for not less or longer than a predefined duration in the building or part of the building and/or stayed not only in the predefined region of the building or part of the building.

According to one exemplary configuration of the method according to the first aspect, the method further comprises:

Deciding whether the action was performed successfully based at least on the determination that the person has left the building or the part of the building.

If it is for example determined that the person has left the building or the part of the building (i.e. in particular when it is determined that the entrance securable with respect to unauthorised access was secured from the outside), it can be decided whether the action was performed successfully. A successfully performed action is for example successful collection or delivery of one or a plurality of shipments by a delivery agent. It is possible for the decision whether the action was performed successfully to also take place based on additional conditions. The information that the action was performed successfully can in particular be sent to an apparatus according to the second aspect.

In this respect, according to an exemplary configuration of the method according to the second aspect, the method further comprises:

Checking whether the action was performed successfully.

For example, checking whether the action was performed successfully takes place before and/or after the predefined duration (according to the second aspect) has elapsed. For example, checking whether the action was performed successfully takes place based on information received that the action was performed successfully which was sent by an apparatus according to the first or third aspect. As part of the method according to the second aspect, information can also be provided that the action was performed successfully and for example be sent to an administrator or a resident of the building or the part of the building.

According to one exemplary configuration of the method according to the first aspect, the method further comprises:

Querying or triggering a query of the person why the predefined duration has elapsed and/or the predefined region was left.

In particular when it is determined that the person stayed in the building or part of the building for not less or longer than the predefined duration in order to perform the action and/or did not only stay in a predefined region of the building or part of the building, such a query or triggering thereof can take place. Information representative of the reason or reasons why the predefined duration has elapsed and/or the predefined region was left can for example be sent to an apparatus according to the second aspect (in particular a server). For example, such a query or triggering thereof only takes place when there is internet access.

In this respect, according to an exemplary configuration of the method according to the second aspect, the method further comprises:

Receiving information representative of a reason why the predefined duration has elapsed and/or the predefined region was left.

The information representative of a reason why the predefined duration has elapsed and/or the predefined region was left is preferably stored (by an apparatus according to the second aspect). Based on the stored information, the predefined duration and/or the predefined region can be optimised for actions to be subsequently performed. In this respect, a method according to the second aspect in particular can also comprise: Optimising the predefined duration and/or the predefined region for actions to be performed based on information representative of reasons why the predefined duration has elapsed and/or the predefined region was left.

Also in this respect, according to an exemplary configuration of the method according to the second aspect, the method can also comprise:

Providing information representative of a reason why the predefined duration has elapsed and/or the predefined region was left.

Additional individuals (for example an administrator or a resident of the building or the part of the building) can hereby obtain the information why the predefined duration has elapsed and/or the predefined region was left.

According to an exemplary configuration of the method according to the first aspect, the person is a delivery agent and/or the action to be performed is delivery or collection of a shipment.

A delivery agent is for example tasked with delivery of letters, courier, express and additional post services. A delivery agent is for example a letter and package deliverer, parcel carrier, postman or postal carrier. Accordingly, shipment can in particular be an item of correspondence (for example a letter, a postcard, a printed material, advertising mail, a circular etc.) or a small goods shipment (for example a book shipment, a small package, a small economy package, a parcel, a goods shipment etc.).

According to an exemplary configuration of the method according to the second aspect, the method therefore also comprises:

Receiving information concerning an entry of the person into the building or the part of the building from an intruder alarm system; and/or Providing information concerning the authorisation of an entry of the person into the building or the part of the building to an intruder alarm system.

For example, the intruder alarm system determines an entry of a person in the building or part of the building (for example in a room). For example, this information is sent to an apparatus according to the second aspect which then receives this information. For example, the apparatus according to the second aspect checks whether the reported entry was previously approved and thus is authorised. In this case, information concerning the authorisation of the entry of the person into the building or the part of the building can then be sent to the intruder alarm system. A false alarm by the intruder alarm system can thus be avoided.

The exemplary configurations of the present invention previously described in this description should also be understood as being disclosed in all combinations with each other.

Further advantageous exemplary configurations of the invention can be inferred from the following detailed description of a number of exemplary embodiments of the invention, in particular in combination with the figures. However, the figures are only intended to be used for illustration purposes and not to define the scope of protection of the invention. The figures are not true to scale and are simply intended to reflect in exemplary form the general concept of the present invention. In particular, features which are contained in the figures, should in no way be considered as a necessary element of the present invention.

DETAILED DESCRIPTION OF A NUMBER OF EXEMPLARY EMBODIMENTS OF THE INVENTION

Figure 1:
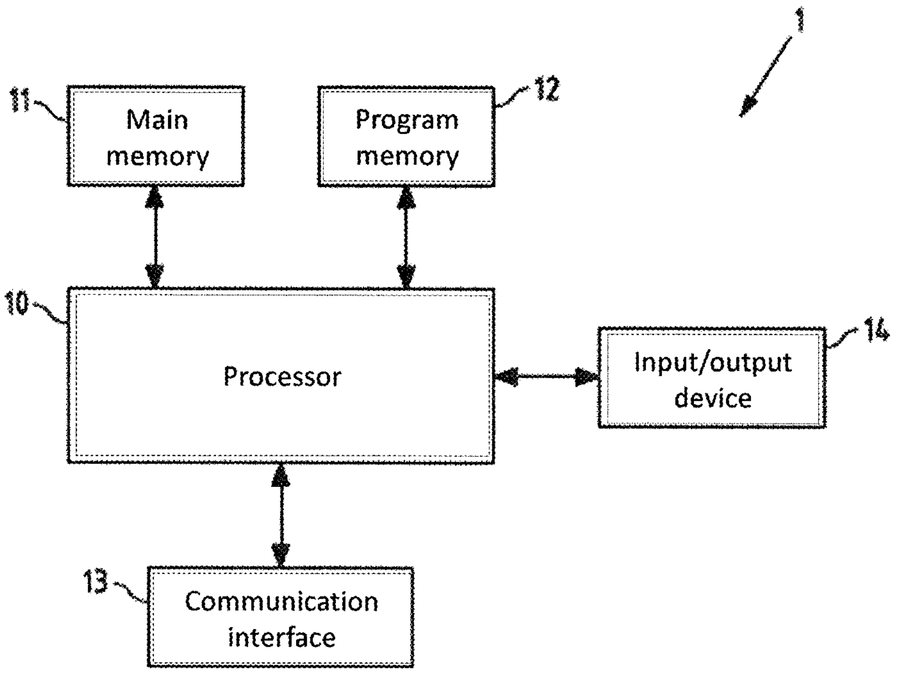
FIG. 1 shows a block diagram of an exemplary embodiment of apparatuses according to the invention.

FIG. 1 shows a block diagram of an exemplary embodiment of an apparatus 1 according to the invention. The apparatus 1 formed as a data processing system serves as an example for apparatuses according to the different aspects, in particular an apparatus according to the first, second or third aspect (for example apparatus 100, 200, 300 or 350) can be designed according to the apparatus 1.

The apparatus 1 can, in this respect, for example be a computer, a desktop computer, a server, a thinclient or a portable computer such as a laptop computer, a tablet computer, a personal digital assistant (PDA), a smartphone or a hand scanner. The apparatus can for example fulfil the function of a server or a client.

Processor 10 of the apparatus 1 is in particular formed as a microprocessor, microcontrol unit, microcontroller, digital signal processor (DSP), application-specific integrated circuit (ASIC) or field programmable gate array (FPGA).

Processor 10 executes program instructions which are stored in the program memory 12 and stores, for example, intermediate results or similar in working or main memory 11. For example, program memory 120 is a non-volatile memory such as a flash memory, a magnetic memory, an EEPROM memory (electrically erasable programmable read-only memory) and/or an optical memory. Main memory 11 is, for example, a volatile or non-volatile memory, in particular a memory with random access memory (RAM) such as a static RAM memory (SRAM), a dynamic RAM memory (DRAM), a ferroelectric RAM memory (FeRAM) and/or a magnetic RAM memory (MRAM).

Program memory 12 is preferably a local data carrier permanently connected to the apparatus 1. Data carriers permanently connected to the data processing system 1 are for example hard discs that are installed in the apparatus 1. Alternatively, the data carrier can for example also be a data carrier that is detachably connectable to the apparatus 1 such as a memory stick, a removable data carrier, a portable hard disc, a CD, a DVD and/or a diskette.

Program memory 12 for example contains the operating system of the apparatus 1 which, on starting the apparatus 1, is, at least in some cases, loaded into the main memory 11 and executed by the processor 10. In particular, upon starting apparatus 1, at least one part of the core of the operating system is loaded in the main memory 11 and executed by the processor 10. The operating system of apparatus 1 is for example a Windows, UNIX, Linux, Android, Apple iOS and/or MAC operating system.

In particular, the operating system makes it possible to use the apparatus 1 for data processing. For example, it administers tools such as main storage device 11 and program storage device 12, network interface 13, input and output device 14, provides fundamental functions inter alia through programming interfaces with other programs and controls the execution of computer programs.

Processor 10 controls the communications interface 13 which can for example be a network interface and be formed as a network card, network module and/or modem. The communications interface 13 is, in particular, configured to establish a connection of the apparatus 1 with other apparatuses, in particular via a (wireless) communications system, for example a network and communicate therewith. The communications interface 13 can for example receive data (via the communications system) and provide it to processor 10 and/or receive data from processor 10 and send it (via the communications system). Examples of communications systems are a local area network (LAN), a wide area network (WAN), a wireless network (for example according to the IEEE-802.11 standard, the Bluetooth (LE) standard and/or the NFC standard), a wired network, a mobile phone network, a telephone network and/or the internet.

Furthermore, processor 10 can control at least one input/output device 14. An input/output device 14 is for example a keyboard, a mouse, a display unit, a microphone, a touch-sensitive display unit, a speaker, a reading apparatus, a disc drive and/or a camera. An input/output device 14 can, for example, receive inputs from a user and provide them to processor 10 and/or receive and send information for the user of processor 10.

FIGS. 2*a* to 2*f* show a flow diagram of a first exemplary embodiment of methods according to the invention according to the different aspects of the present invention. The interfaces between the figures are labelled with reference numerals in the flow diagram. The exemplary embodiment relates to the delivery of a parcel by a delivery agent 400. The example is, however, also transferable to other actions to be performed by other individuals.

The represented exemplary embodiment is implemented in this case with a mobile device 100 (for example a mobile telephone or a hand scanner) of the delivery agent 400 as an exemplary apparatus according to the first aspect to perform an exemplary method according to the first aspect, with a server 200 as an exemplary apparatus according to the second aspect to perform an exemplary method according to the second aspect and with an electronic door lock 300 and a beacon 350 respectively as exemplary apparatuses according to the third aspect to perform an exemplary method according to the third aspect. Actions are also performed by an administration application 500. Actions concerning the delivery agent 400 are also represented.

The exemplary embodiment is suitable in particular for a delivery in a private secure area, for example in an apartment behind an apartment door.

The delivery agent 400 with the mobile device 100 is initially located in front of a residence to which the parcel is supposed to be delivered (action 401). The mobile device 100 has access to the internet and can locate its position representative of the position of the delivery agent 400 for example by means of GPS.

The delivery agent 400 operates the mobile device and requests access to the apartment by means of an input device (action 402). The mobile device 100 then requests access authorisation information and also sends position data, for example based on GPS data or the signal strength of the mobile phone network (action 101). The server 200 receives the request and check the plausibility of the requested access in any case based on a position of the mobile device 100 representative of the position of the delivery agent 400 (action 201). The server 200 requests access authorisation information from an administration application 500. It can be operated for example by an employee of the delivery company or the resident of the apartment Access authorisations are assigned by means of the administration application 500. This can occur ad hoc, i.e. only when the delivery agent 400 is located in front of the residence (action 501). Alternatively, access authorisations can also be allocated in advance and stored on the server 200. The server 200 receives access authorisation information from the administration application 500 such that a personal and client-specific allocation of access authorisations by the server 200 can take place (action 202). In this case, a (first) predefined duration is determined for which the delivery agent is allowed to at most stay in the apartment for the delivery, in this example 15 seconds. The communication with the administration application 500 takes place for example by means of email, SMS and/or push notifications.

The server 200 allocates an access authorisation that is unique (i.e. to be used only once), immediate (i.e. usable only within a very limited duration) and time-limited (i.e. permitting only a determined stay) and sends access authorisation information to the mobile device 100 for this purpose (action 203). Sending the access authorisation information also includes sending the first predefined duration, for which the delivery agent 400 is allowed to at most stay in the apartment A timer with a (second) predefined duration is initialised and started on the server side triggered by the sending of the access authorisation information (action 204). The second predefined duration is for example 5 minutes. This second predefined duration serves as an additional verification on the server side of the stay of the delivery agent, for example in the event that the communication with the mobile device 100 terminates. After initialising the server-side timer with the second predefined duration, the server 200 sends information representative of the beginning of the house delivery to the administration application 500 (action 205) which displays it (action 502).

The information that the house delivery is beginning can also be provided to an intruder alarm system (IAS) of the house or the apartment in order to avoid a false alarm.

The access authorisation information is received by the mobile device 100 (action 102). A response including the first predefined duration takes place to the delivery agent 400, for example via an output device (for example the screen) of the mobile device 100 (action 403). The delivery agent 400 goes to the door (action 404) and opens the door with the mobile device 100 (action 405).

The mobile device 100 then sends access authorisation information (preferably including the first predefined duration) to the electronic door lock 300 (action 103) which is then unlocked (for example unlocked and opened) (action 301).

The electronic lock 300 then regularly sends signals for the received first predefined duration which allow the position in the apartment to be deduced, for example Bluetooth signals (action 302). The electronic lock can thus in particular check whether the first predefined duration is reached (action 303) and then adjust the sending of the signals. The information that the door is opened or is open can also be sent to the beacon 350 which then also regularly sends (Bluetooth) signals which allow the position in the apartment to be deduced (action 352). The (internet-capable) beacon 350 can optionally (or alternatively the mobile device 100 after obtaining a confirmation that the door is opened or is open) provide the information indicative of an unlocking of the door to the server 200 (action 351).

The delivery agent 400 can now place the parcel behind the door in the entrance region of the apartment (action 406). In this case, checking whether the delivery agent stayed in the apartment for less or no longer than the (first and/or second) predefined duration for the delivery and only stayed in a predefined region of the apartment takes place as is described in greater detail below.

After sending the access authorisation information (action 103) by the mobile device 100 (and preferably after obtaining a confirmation by the electronic lock 300 that the door is unlocked), it is verified whether the mobile device 100 has a connection to the internet (action 106) and if not, whether there is a connection to a mobile phone network (action 107). Information representative of the unlocking of the apartment door is sent to the server 200 dependent on the check and is received there via the internet (action 206) or by SMS or telephone call (action 207). The server 200 in turn sends information representative of the beginning of the apartment delivery to the administration application 500 (action 206 or 207) which displays it (action 503).

Furthermore, monitoring in relation to the signals sent by the electronic door lock 300 and the beacon 350 is started by the mobile device 100 (action 104) in order to verify the stay of the person in the predefined region. This can in particular be verified based on the receipt of the beacon and/or door lock signals and the signal strength. A timer with the first predefined duration is also initialised and started (action 105). Sensor monitoring (action 105) comprising the analysis of sensor data (action 108) is also started.

Figure 2A:
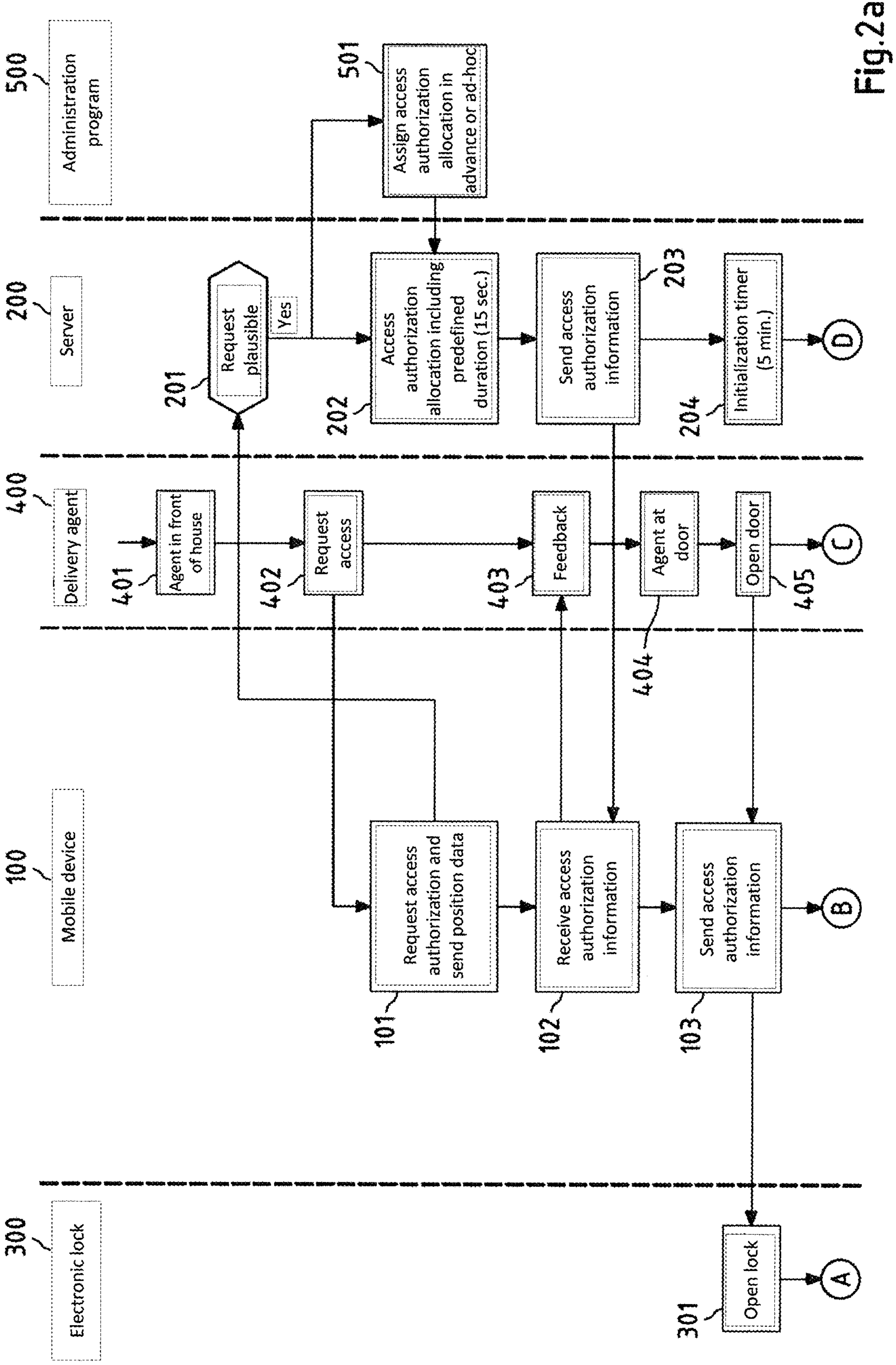
FIGS. 2*a-f* show a flow diagram of a first exemplary embodiment of methods according to the invention.
Figure 2B:
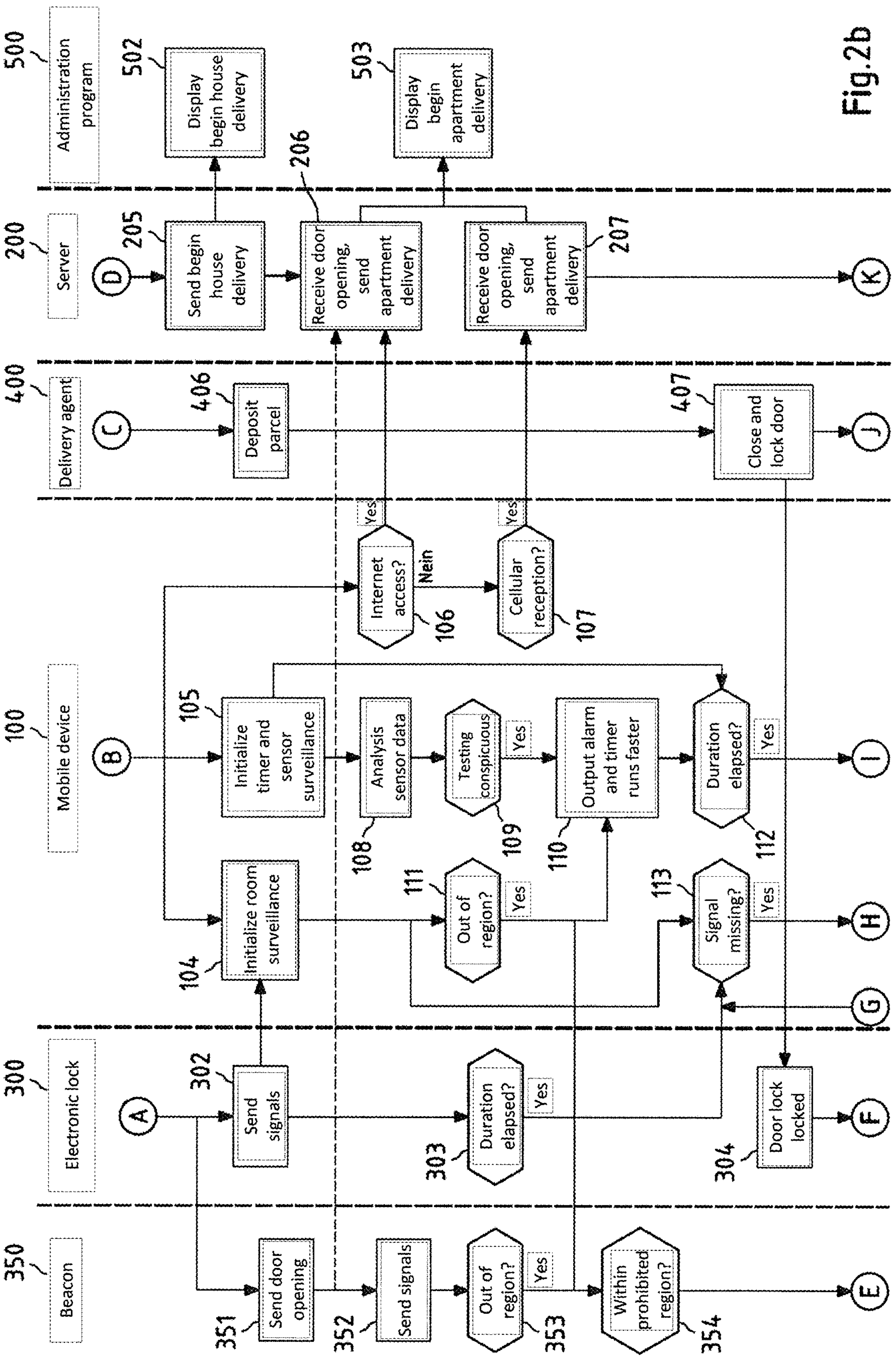
Figure 2C:
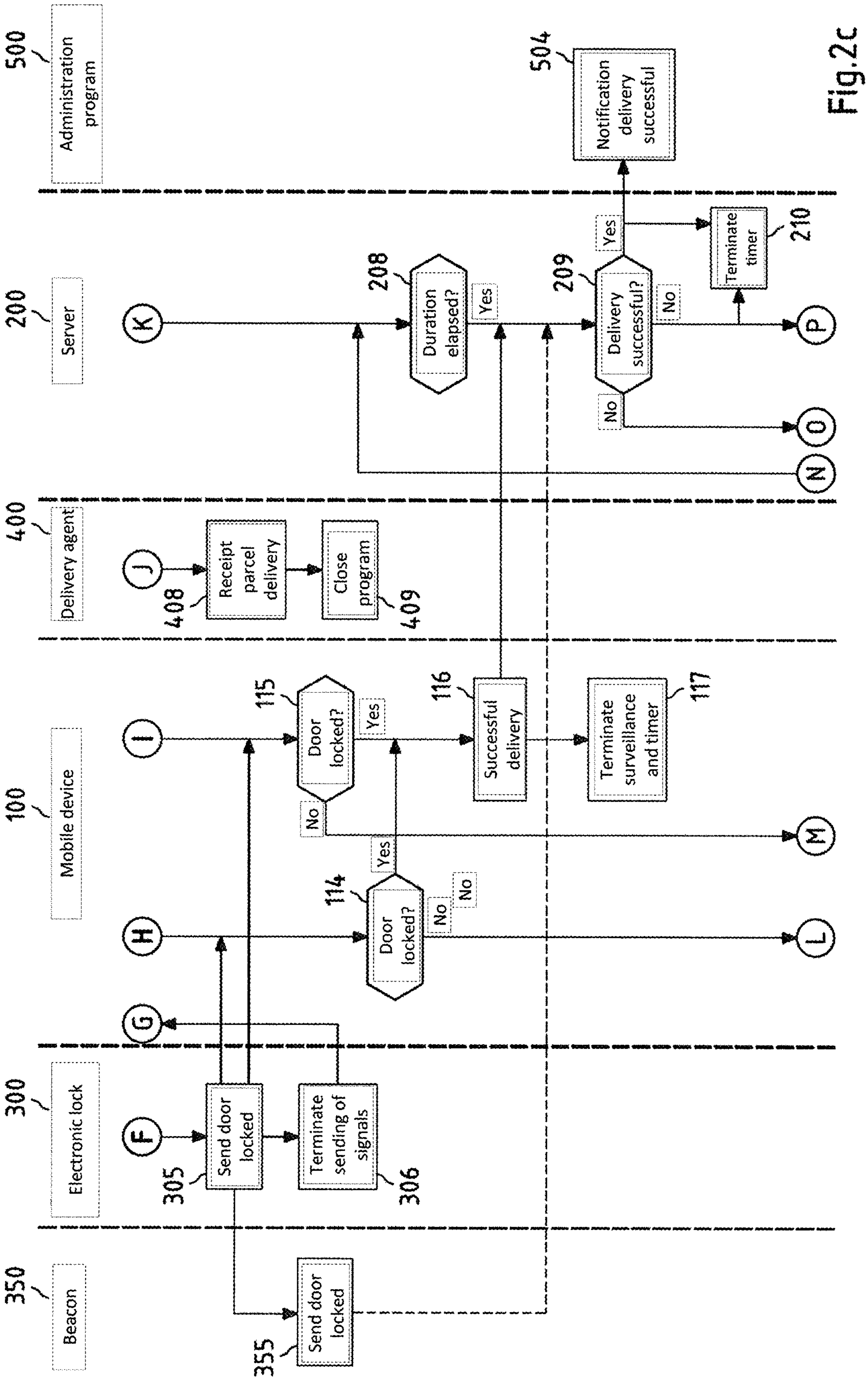
Figure 2D:
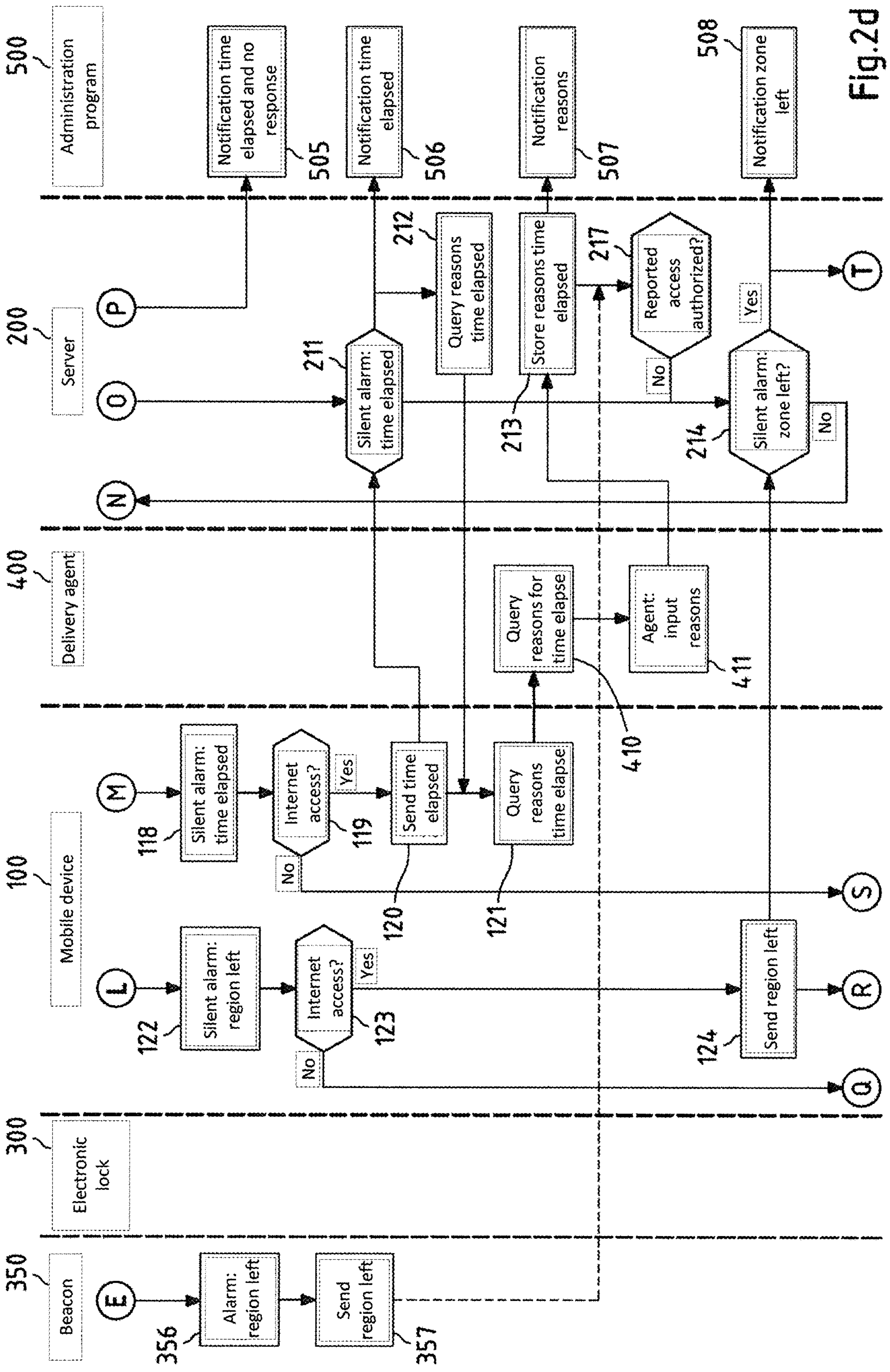
Figure 2E:
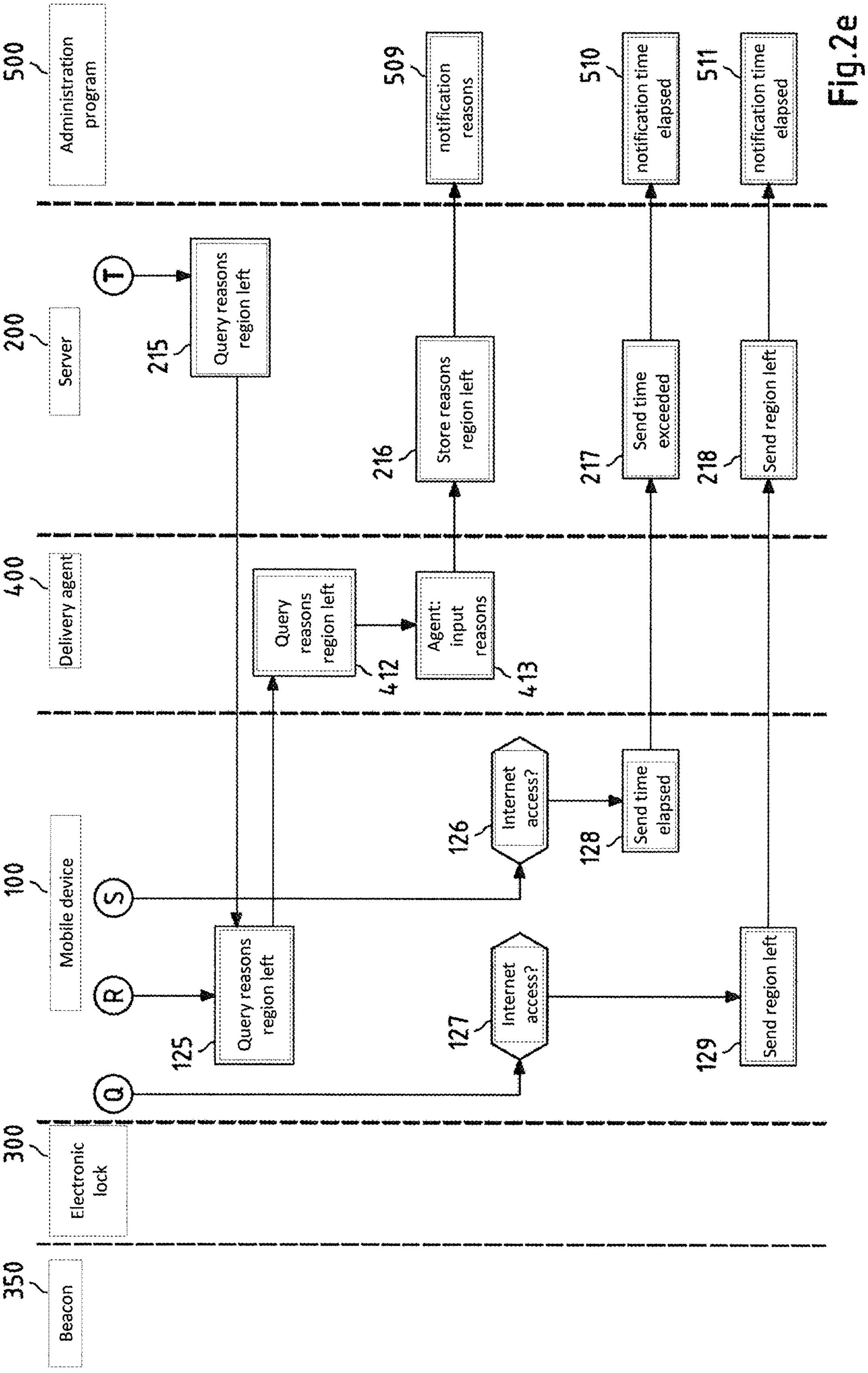
Figure 2F:
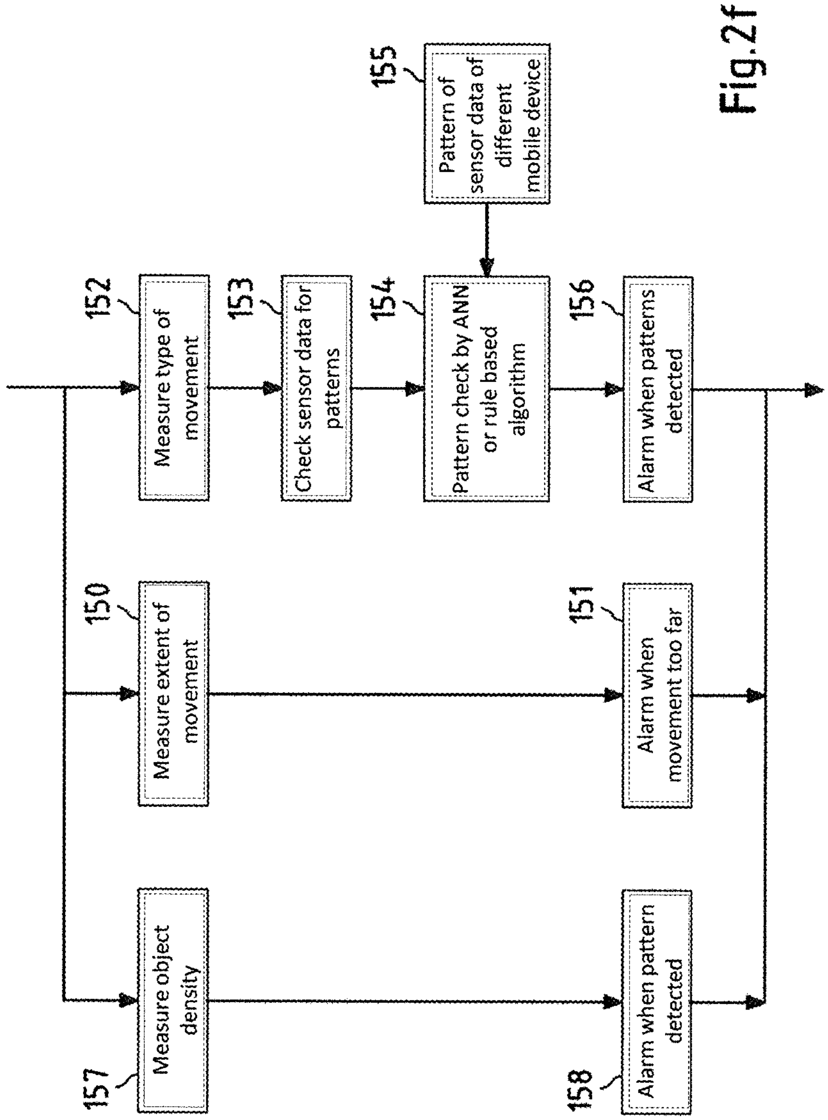

The sensor monitoring (actions 105, 108) represented in FIG. 2*b* is represented by way of example with additional details in FIG. 2*f* and is now described in more detail in connection with FIG. 2*f* The sensors used are preferably sensors of the mobile device 100 itself On the one hand, the movement width of the mobile device and therefore indirectly that of the delivery agent 400 is measured (action 150). For example, a conclusion is drawn concerning conspicuous behaviour of the delivery agent 400 and in the case of a movement above a threshold value (for example a movement of more than 2 m) an alarm signal is emitted (action 151).

Additionally, sensor data (for example of a motion sensor, of an acceleration sensor, of a magnetic field sensors, of a gyroscope, of a magnetometer and/or of an infrared sensor) are measured to determine for example an orientation, an acceleration, the earth's magnetic field and/or a rotation (action 152). The data are then in particular verified for patterns (action 153). This can for example be performed by a rule-based algorithm or an artificial neuronal network (ANN) (action 154). Examples of undesired conspicuous behaviour (and associated detectable patterns) are placing down the mobile device (no movement), running (very fast movement), swinging (excessively regular movement), shaking (excessively short, frequent impacts), throwing. In particular in the case of an artificial neuronal network, it can be trained by sensor data of different mobile devices (action 155). If a conclusion is drawn concerning conspicuous behaviour of the delivery agent 400, an alarm signal can in turn be emitted (action 156).

Furthermore, radio signals, in particular according to the IEEE-802.11 standard, the Bluetooth standard or the NFC standard can be received and used as sensor data. To this end, for example the strength and/or change of the signals is taken into account, which for example can be influenced and/or caused by shadowing, reflection and/or the Doppler effect. This sensor data can also to this end be verified for (conspicuous) patterns (action 157). For example, to this end, one or a plurality of object density(ies) (in the vicinity) can be measured which are representative of one or a plurality of individuals. In particular, the extent and the direction of the change can be determined. If for example a plurality of (different) object densities are determined, it can be determined as an example of a conspicuous pattern that more than one person is present. If a conclusion is drawn concerning conspicuous behaviour of the delivery agent 400 or more additional individuals, an alarm signal can in turn be emitted (action 158). For example, in the case of falling below and/or exceeding the object density below or above a threshold value (for example 30% object density drop within 5 seconds) may be a conspicuous pattern since this indicates removal of an additional person.

Additional sensors can also still be used in order to draw a conclusion concerning conspicuous behaviour of the delivery agent 400. For example, it can be (repeatedly) verified by means of a fingerprint sensor of the mobile device 100 whether the delivery agent 400 holds the mobile device 100 in their hand.

Returning to FIG. 2*b*, it is now checked whether the analysis emits an alarm signal and a conclusion can be drawn concerning conspicuous behaviour (action 109). As a consequence, an (acoustic and/or optical) alarm can for example be emitted from the mobile device 100 for the delivery agent (action 110). Alternatively or additionally, the predefined duration can be shortened, for example by running the timer faster (action 110).

The same consequence (i.e. action 110) can take place when the mobile device 100 determines that the delivery agent did not only stay in the predefined region, for example because the signals of the electronic lock 300 and/or the beacon 350 are too weak (action 111). Alternatively or additionally, the beacon 350 can determine that the delivery agent stayed outside of the predefined region (action 353) and/or is located within a prohibited area (action 354).

The check represented in FIG. 2*b* whether the delivery agent only stayed in the predefined region is now described in more detail using an example in connection with FIG. 3.

Figure 3C:
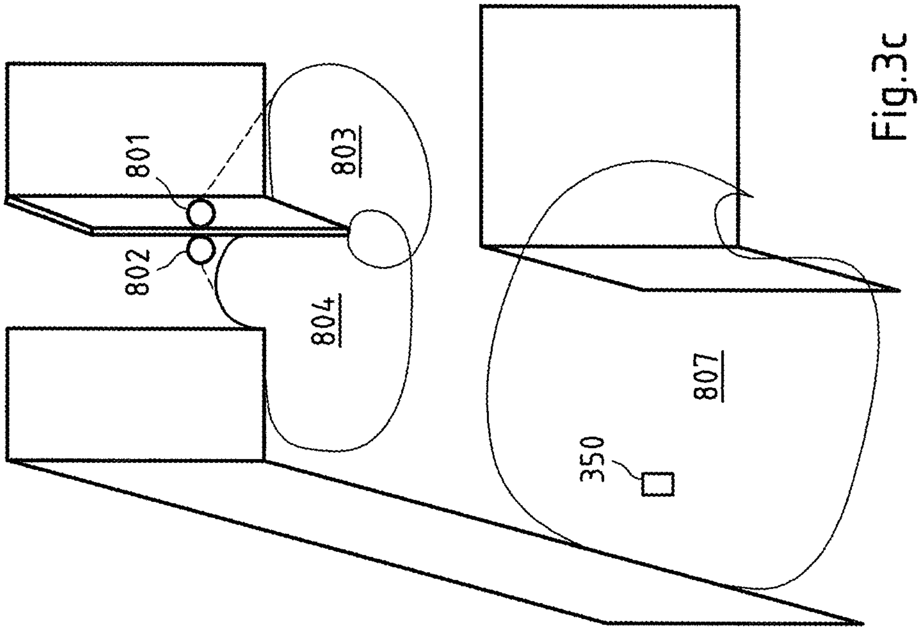
FIGS. 3*a-c* show an exemplary schematic representation of different regions of a part of the building.
Figure 3A:
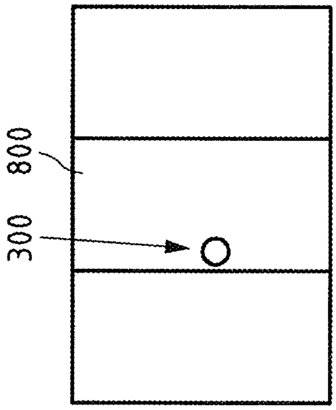
Figure 3B:
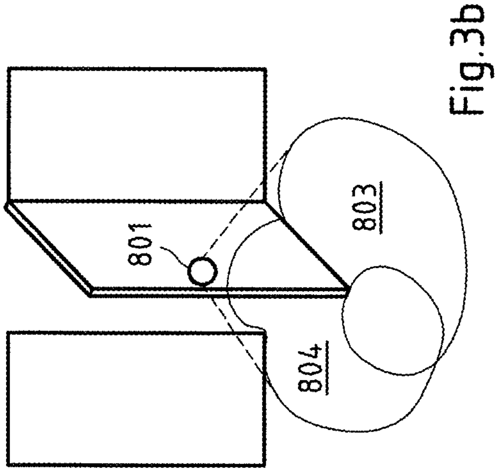

FIG. 3*a-c* show an exemplary schematic representation of different regions of a part of the building. The entrance in the form of the door 800 comprises an electronic lock, for example the electronic lock 300. The electronic lock 300 comprises both on its inside and on its outside a Bluetooth LE chip. The electronic lock 300 therefore provides a beacon 801 on its inside and a beacon 802 on its outside (see FIG. 3*c*). The beacons 801, 802 define in the region, in which the signals of the beacons 801, 802 can be received (or are above a threshold value), permitted regions 803, 804. The delivery agent is allowed to stay in this area during the delivery. If it is thus determined that the mobile device 100 is located in the region 803 or 804, it can be assumed that the delivery agent 400 stays in the predefined region. In the region 805, on the other hand, the signals of the beacons 801, 802 are not received or received only below a threshold value. This region 805 constitutes a prohibited region outside of the predefined region. If it is thus determined that the mobile device 100 is not located in the region 803 or 804, it can be assumed that the delivery agent 400 does not stay only in the predefined region. Furthermore, a separate Bluetooth beacon 350 is placed in the entrance region. The region 807, in which the signals of the beacon 350 are received or are above a threshold value, is in this case a prohibited region. If it is thus determined that the mobile device 100 is located in the region 807, it can be assumed that the delivery agent 400 stays outside of the predefined region and therefore does not stay only in the predefined region. It is for example also possible to define an additional permitted region, instead of a prohibited region, by way of the beacon 350.

Essentially, the presence of the mobile device 100 in the respective region can be performed by the mobile device 100. Alternatively or additionally, it is also, however, conceivable for the position of the mobile device 100 to be determined by the beacons 801, 802, 350. For this purpose, the mobile device 100 can for example regularly send (Bluetooth) signals which are received by the beacons. Based on for example the received signal strength of the signals sent by the mobile device 100, the position of the mobile device 100 can then be determined.

Figure 4C:
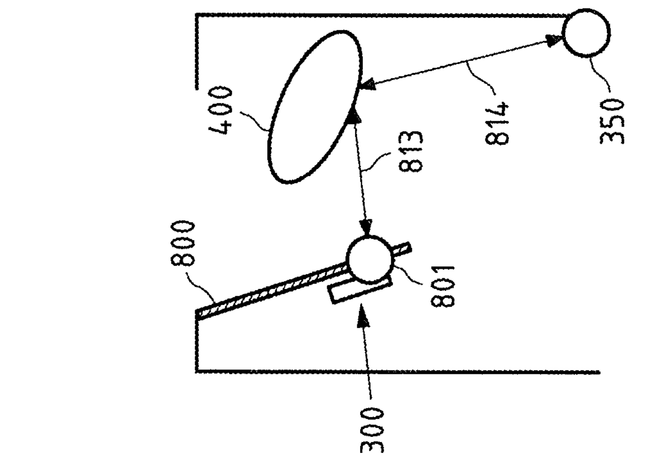
FIGS. 4*a-c* show an exemplary schematic representation of a position determination in a part of the building.
Figure 4B:
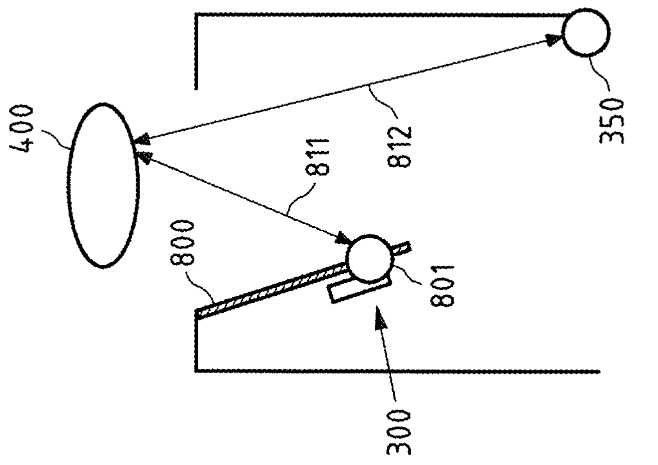
Figure 4A:
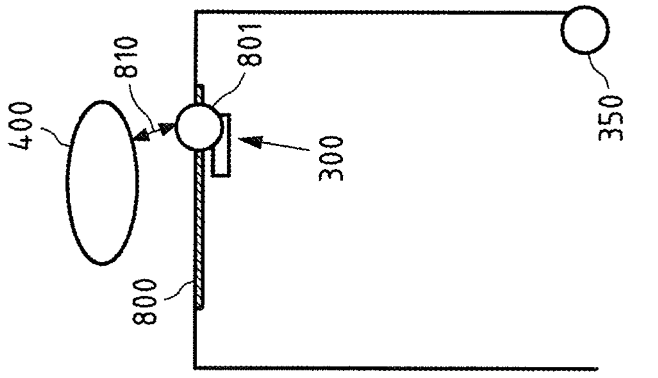

Using FIG. 4*a-c*, an additional example is shown regarding how alternatively or also in combination with the one previously described, checking whether the delivery agent only stayed in the predefined region can be performed.

The delivery agent 400 is located in front of the door 800 with the electronic lock 300. The electronic lock 300 comprises a Bluetooth LE chip such that the electronic lock also comprises a beacon 801. A additional separate beacon 350 was also placed in the building or part of the building. The signal strength (for example the received signal strength) of the signals of the beacon 801 can be measured by a mobile device (for example the mobile device 100, for example a smartphone) of the delivery agent 400 upon opening (for example shortly before, shortly after or during) the door 800. In this case, the mobile device has the distance 810 from beacon 801. The door 800 is then opened, which leads to an increased distance 811 from the beacon 801 and to a lower signal strength (FIG. 4*b*). The distance 811 will substantially correspond to the width of the door 800. Based on typical values or empirical values for the distance 810 and/or 811, a conversion factor can be determined by means of which the distance between mobile device 100 and corresponding beacon can be determined from the received signal strength. In the case of opened door 800, the signal strength of signals of the beacon 350 distanced a distance 812 can also be measured by the mobile device 100. If the delivery agent 400 enters the building or the part of the building to deliver a shipment (FIG. 3*c*), the signal strengths change according to the distances 813, 814 of the beacons 801, 350. In particular based on the conversion factor and with the aid of triangulation, the position of the mobile device 100 and therefore of the delivery agent 400 can be determined. If the delivery agent 400 proceeds too far into the building or the part of the building, i.e. if the delivery agent does not stay only in a predefined region, this can be determined by the mobile device.

In particular in this connection, it is advantage for the measured signal strengths and/or the determined conversion factors to for example be transferred to a server (for example server 200). This information can allow the subsequent determination of the conversion factor to be optimised by the underlying model being adapted based on the information.

The methods represented in FIG. 3, 4, however, constitute only one possible exemplary embodiment in order to determine whether the delivery agent 400 only stayed in the predefined region. Other, in particular described embodiments are also possible (for example based on positioning of the mobile device 100 based on WLAN signals or the earth's magnetic field). To name one additional example, alternatively or additionally, motion detectors (for example a PIR sensor) can be used to verify whether the delivery agent 400 only stayed in the predefined region.

Returning to FIG. 2*b*, in particular in the cases where the first predefined duration has elapsed (action 112), a signal is not received to deduce the position (action 113) and/or it is determined that the delivery agent is located outside of the predefined region, for example because the signal is too weak (action 111, action 353), it is checked whether the delivery agent has left the house or the apartment. In this case, this is enabled by checking whether the door is locked from the outside (action 114, 115). Essentially, however, it is also possible for checking the door status (in particular whether the door is locked from the outside) to take place triggered by other events or to check in another manner whether the house or the apartment was left.

For the case where the delivery agent 400 has placed down the parcel (action 406) and then closed the door and locked it from the outside (action 407), this is determined by the electronic door lock 300 (action 304) and information indicative of successful securing of the door is sent to the mobile device 100 and/or the beacon 350 (action 305). The regular sending of the signals to deduce the position can be stopped (action 306). In this case, a verification of the door status leads to a positive result (i.e. it is determined that the door is locked from the outside) such that it can be decided that a successful delivery has taken place (action 116). Information indicative of a successful delivery can also be sent to the server 200. Both the spatial monitoring, the sensor monitoring and the timer can then be stopped (action 117).

It can optionally be requested that the delivery agent 400 manually confirm the parcel delivery via an input device of the mobile device 100 (action 408). The delivery agent can close the program on the mobile device if required (action 409).

The server 200 verifies whether the delivery was successful (action 209), in particular if the second predefined duration has elapsed (action 208). If the server received the information indicative of a successful delivery from the mobile device 100, in particular information indicative of a successful delivery can be sent to the administration application 500 so that an administrator or the resident can be notified concerning the successful delivery (action 504). The server-side timer can then also be stopped (action 210).

If, on the other hand, after a elapsed second predefined duration in the case of action 209, it is determined that the delivery was not successful, information indicative of an unsuccessful delivery is sent to the administration application 500 such that the user can be notified concerning a delivery with a elapsing of time without a response from the delivery agent 400 (action 505).

Alternatively or additionally, information indicative of a successful securing of the door can also be sent by the beacon 350 to the server 200 (action 355). Based on this information, it can then be determined by the server 200 that the delivery was successful (action 209).

Now the case is considered where it is determined that the delivery agent 400 stayed for not less or longer than a predefined duration and/or stayed not only in the predefined region in the apartment. This is in particular the case when in the case of action 114 and/or action 115, it is not determined that the door was locked from the outside.

If it is determined that the delivery agent 400 stayed for not less or longer than a predefined duration in the apartment (for example after checking according to action 115), a preferably silent alarm is triggered (action 118). A silent alarm is in particular understood as the alarm not being discernible to the delivery agent 400 in order to reduce the danger of the mobile device 100 being deactivated or switched off. It is firstly verified which kind of communications connection to the mobile device 100 is available. In this example, it is firstly checked whether there is a connection to the internet (action 119). If this is the case, a notification indicative of a elapsing of time is sent to the server 200 (action 120). The sever 200 verifies (for example regularly, in particular as long as the second predefined duration has not yet elapsed (see action 208)) whether a timeout was reported (action 211). If this is the case, on the one hand, a notification is sent to the administration application 500 so that the user is notified concerning the timeout (optionally with the information to what extent the predefined duration was exceeded, action 506). On the other hand, a query of the reasons why the timeout took place is triggered by the server 200 (action 212). The mobile device 100 then queries the reasons for this with the delivery agent 400 (action 121, action 410). The delivery agent 400 can input the reasons on the mobile device 100 by means of an input device (action 411). The reasons are sent to the server 200 and stored by the server (action 213). A notification can also be sent to the administration application 500 so that the user is notified of the reasons (action 507).

If it is determined that the delivery agent 400 did not only stay in the predefined region in the apartment (for example after checking according to action 114), a preferably silent alarm is also triggered (action 122). It is firstly verified which kind of communications connection to the mobile device 100 is available. In this example, it is firstly checked whether there is a connection to the internet (action 123). If this is the case, a notification indicative of the region being left is sent to the server 200 (action 124). The sever 200 verifies (for example regularly, in particular as long as the second predefined duration has not yet elapsed (see action 208)) whether the region being left was reported (action 214). If this is the case, on the one hand, a notification is sent to the administration application 500 so that the user is notified concerning the region being left (action 508). On the other hand, a query of the reasons why the region was left is triggered by the server 200 (action 215). The mobile device 100 then queries the reasons for this with the delivery agent 400 (action 125, action 412). The delivery agent 400 can input the reasons on the mobile device 100 by means of an input device (action 413). The reasons are sent to the server 200 and stored by the server (action 216). A notification can also be sent to the administration application 500 so that the user is notified of the reasons (action 509).

Additionally or alternatively, the beacon 350 (for example when stay of the delivery agent 400 in a prohibited area is determined by the beacon 350 (action 354)) can trigger an alarm (action 356) and/or can send information indicative of the predefined region being left to the server 200 (action 357). Information indicative of an entry to the building, part of the building or a part thereof can also be sent by an intruder alarm system to the server 200. In this case, it can be taken into account on the server side whether the respective behaviour was previously authorised (action 217). Such an authorisation can be received by the intruder alarm system. This can avoid a false alarm by the intruder alarm system.

The server-side checking for an alarm in relation to a timeout (action 211) or in relation to the region being left (action 214) can be repeated (periodically) until the second predefined duration has elapsed (action 208).

If there is no internet connection (action 119 or 123), it is checked in this example whether there is a connection to a mobile phone network for the mobile device 100 (action 126 or 127). If this is the case, a notification indicative of a timeout or the region being left is sent to the server 200 (action 128 or 129). This can for example take place by means of SMS or by means of a telephone call. The server 200 sends a notification to the administration application 500 (action 217 or 218) so that the user can be notified concerning the timeout or concerning the region being left (without a response from the delivery agent 400) (action 510 or 511).

Figure 5A:
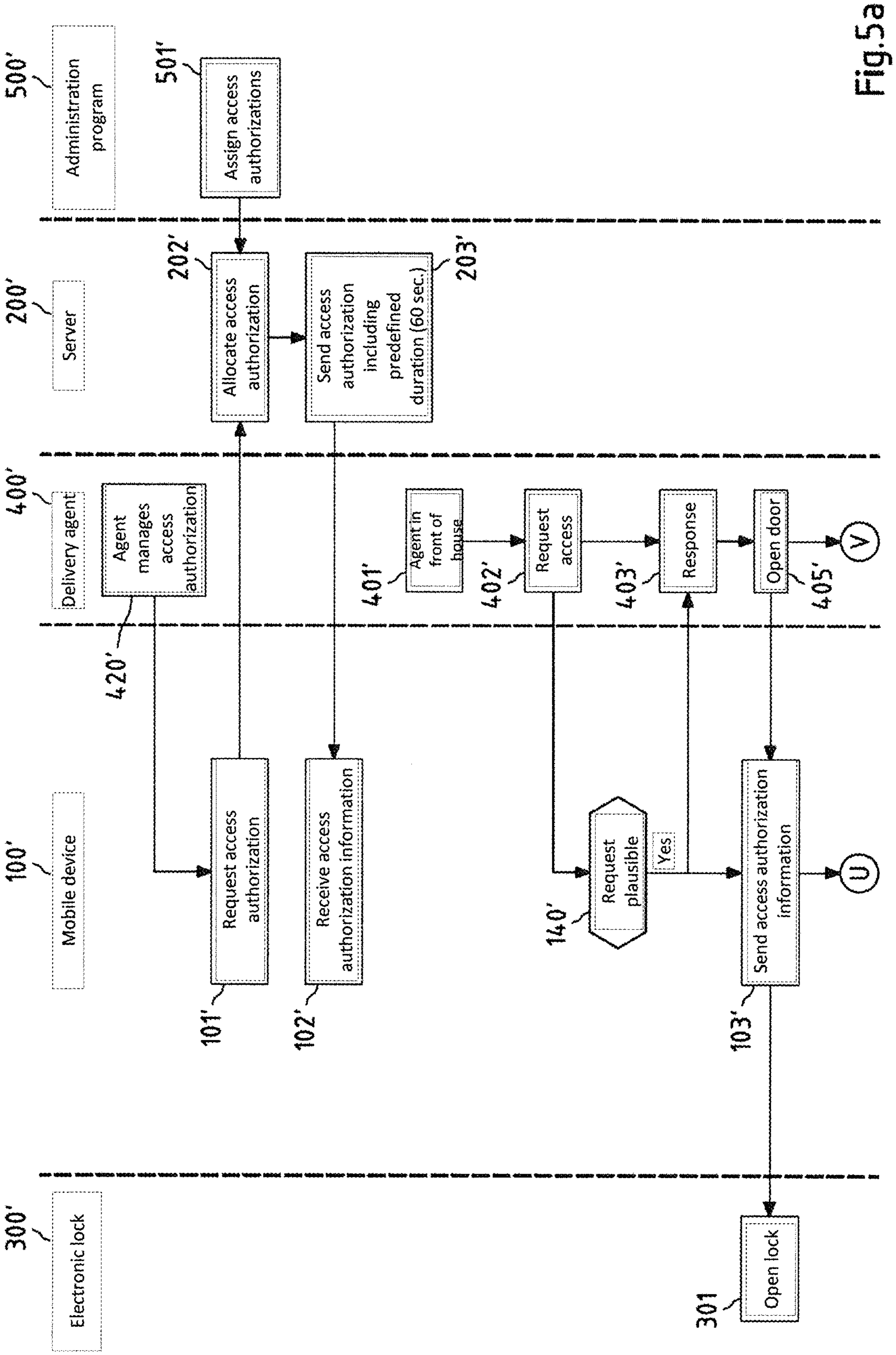
FIGS. 5*a, b* show a flow diagram of a second exemplary embodiment of methods according to the invention.

The FIGS. 5*a*, 513 show a flow diagram of a second exemplary embodiment of methods according to the invention according to the different aspects. The interfaces between the figures are labelled with reference numerals in the flow diagram. The exemplary embodiment relates to the delivery of a parcel by a delivery agent. The example is, in turn, also transferable to other actions to be performed by other individuals.

Figure 5B:
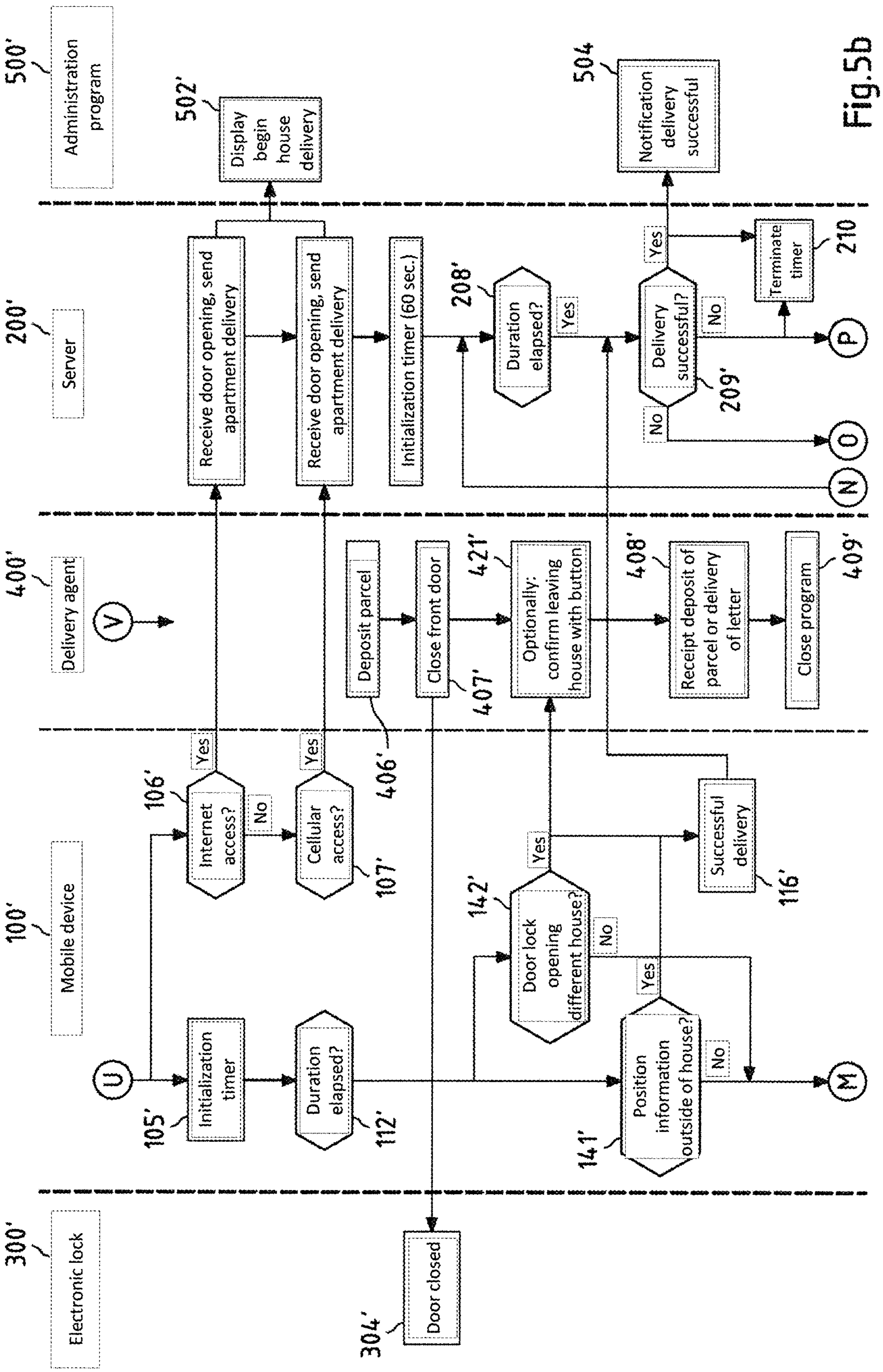

Unlike the exemplary embodiment from FIG. 2, this exemplary embodiment is in particular suitable for a delivery in a partially public secure area, for example a stairwell. In this case, a separate beacon 350 is not used. It is also not checked in the exemplary embodiment of FIG. 5 whether the delivery agent only stayed in a predefined region. It is only checked whether the delivery agent stayed for less or no longer than a predefined duration in the house.

The represented exemplary embodiment is performed in this case with a mobile device 100' (for example a mobile telephone or a hand scanner) of the delivery agent 400' as an exemplary apparatus according to the first aspect to perform an exemplary method according to the first aspect, with a server 200' as an exemplary apparatus according to the second aspect to perform an exemplary method according to the second aspect and with an electronic door lock 300. Actions are also performed by an administration application 500'. Actions concerning the delivery agent 400' are also represented.

In this case, the delivery agent 400' can administer access authorisations, in particular independently of their location and in advance of the delivery (action 420'). The mobile device 100' then requests corresponding access authorisation information from the server 200' (action 101').

Access authorisations can be assigned or allocated in advance of the delivery for example by an employee of the delivery company or the resident of the apartment by means of the administration application 500' (action 501'). For example, it is determined by means of the administration software 500' that access authorisations can be allocated at certain times (for example such that an entrance is enabled on certain days and times, for example weekdays from 9 am to 5 pm). The server 200' receives access authorisation information from the administration application 500' such that a personal and client-specific allocation of access authorisations by the server 200' can take place (action 202'). The server 200' allocates an access authorisation that is permanent (i.e. to be used repeatedly), stored (i.e. usable at any time) and time-limited (i.e. permitting only a determined stay) and sends access authorisation information to the mobile device 100' for this purpose (action 203'). In this case, a (first) predefined duration is determined for which the delivery agent 400' is allowed to at most stay in the house for the delivery, in this example 60 seconds. Sending the access authorisation information can also include sending the first predefined duration, for which the delivery agent 400' is allowed to at most stay in the house. The access authorisation information is received by the mobile device 100' (action 102'). It is also possible for the access authorisation information to be pushed to the mobile device 100' without a prior request.

If the delivery agent 400' with the mobile device 100' is located in front of a residence to which the parcel is supposed to be delivered (action 401'), entry to the house can be manually requested by means of the mobile device by the delivery agent 400' (or alternatively automatically by the mobile device, for example based on position data) (action 402'). Based on position data, for example based on GPS data or the signal strength of the mobile phone network, the mobile apparatus 100' checks the plausibility of the requested entry at least based on a determined position of the mobile device 100' (action 140').

A response (preferably including the first predefined duration) takes place to the delivery agent 400', for example via the screen of the mobile device 100' (action 403'). The delivery agent 400' opens the door with the mobile device 100' (action 405'). For this purpose, the mobile device 100' sends access authorisation information (preferably including the first predefined duration) to the electronic door lock 300' (action 103') which is then unlocked (for example opened) (action 301').

After sending the access authorisation information (action 103') by the mobile device 100' (and preferably after obtaining a confirmation by the electronic lock 300' that the door is opened), it is verified whether the mobile device 100' has a connection to the internet (action 106') and if not, whether there is a connection to a mobile phone network (action 107'). Information representative of the opening of the house door is sent to the server 200' part of the building the check and is received there via the internet (action 206') or by SMS or telephone call (action 207'). The server 200' in turn sends information representative of the beginning of the house delivery to the administration application 500' (action 206' or 207') which displays it (action 502').

Since the access authorisation information can be sent by the server 200' in this example in particular so as to be time-independent of the actual entry, a server-side timer cannot be triggered by the sending of the access authorisation information, as described in connection with the first exemplary embodiment. Instead of this, a timer with a (second) predefined duration is initialised and started on the server side triggered by the receipt of the information representative of the opening of the house door (action 204'). The second predefined duration is in this case 60 seconds. This second predefined duration serves as an additional verification on the server side of the stay of the delivery agent, for example in the event that the communication with the mobile device 100' terminates.

The delivery agent 400' can now place the parcel behind the door in the house or deliver letters (action 406'). In this case, checking whether the delivery agent stayed for less or no longer than the first and/or a second predefined duration in the house for the delivery takes place.

For this purpose, a timer with the first predefined duration is initialised and started by the mobile device 100' (action 105').

In particular in the case where the first predefined duration has elapsed (action 112'), it is checked whether the delivery agent has left the house. In the case of an apartment building, the delivery agent 400' will not lock the house door from the outside, but rather only shut it (action 407'). The electronic lock can thus only determine closing of the door, but in particular no locking of the door lock (action 304'). In this respect, in this example, checking whether the delivery agent has left the house is implemented such that it is checked whether the position of the person is located outside of the house. This checking is based in this case on the fact that it is checked whether position information representative of the position of the person (for example based on GPS and/or GSM signals) is determined outside of the house (action 141') and/or whether an unlocking of a door lock of another house is determined (action 142').

In the case where the delivery agent 400 has placed down the parcel or delivered the letters (action 406') and then left the house such that a verification leads to a positive result (i.e. it is determined that the delivery agent has left the house), it can be decided that a successful delivery has taken place (action 116'). Information indicative of a successful delivery can also be sent to the server 200'.

It can optionally be requested that the delivery agent 400' confirms leaving the house (action 421') and/or manually acknowledges the package delivery (action 408') via an input device of the mobile device 100'. The delivery agent can close the program on the mobile device if required or leave it active in the background (action 409').

The server 200' verifies whether the delivery was successful (action 209'), in particular if the second predefined duration has elapsed (action 208'). If the server received the information indicative of a successful delivery from the mobile device 100', in particular information indicative of a successful delivery can be sent to the administration application 500' so that an administrator or the resident can be notified concerning the successful delivery (action 504'). The server-side timer can then also be stopped (action 210').

For the case where it is determined that the delivery agent 400 stayed for not less or longer than a predefined duration and/or did not only stay in the predefined region in the apartment, i.e. in particular for the case where the server 200' cannot determine a successful delivery (action 209') or that in the case of action 141' and/or action 142' it is not determined that the delivery agent 400' has left the house, the procedure is performed as already described in connection with the first exemplary embodiment, i.e. the described silent alarm is triggered. The actions 118, 119, 120, 121, 410, 411, 211, 212, 213, 505, 506, 507 of FIG. 2 can therefore in particular follow.

The exemplary embodiments of the present invention described in this specification and the features and properties indicated as being optional in this regard should also be understood to be disclosed in all combinations with one another. In particular, the description of a feature included by an exemplary embodiment, provided the opposite is not explicitly explained, should also not be understood in the present case as the feature being necessary or essential for the function of the exemplary embodiment. The sequence of the method steps shown in this specification in the individual flow diagrams is not authoritative and alternative sequences of the method steps are conceivable. The method steps can be implemented in a different manner, thus an implementation in software (by program instructions), hardware or a combination of the two in order to implement the method steps is conceivable. Terms used in the claims such as "comprise", "have", "contain", "include" and the like do not exclude additional elements or steps. The wording "at least partially" includes both the case of "partially" and also the case of "fully". The wording "and/or" should be understood as both the alternative and the combination being disclosed, i.e. "A and/or B" means "(A) or (B) or (A and B)". The use of the indefinite article does not exclude a plurality. An individual apparatus can carry out the functions of a plurality of units or apparatuses mentioned in the claims. Reference numerals indicated in the claims should not be considered as limitations of the means and steps used.

The invention claimed is:

1. A method performed by at least one apparatus, wherein the at least one apparatus is or comprises a server or a part thereof, the method comprising:

receiving, from a mobile device of a person, a request for access authorisation information to allow entry of the person, in order to perform an action, into a building or a part of the building via an entrance securable with respect to unauthorised entry, wherein the building or the part of the building is accessible via the entrance securable with respect to unauthorised entry, the person being a delivery agent and the action to be performed is to deliver or collect a shipment or delivery:

providing, to the mobile device of the person, access authorisation information to allow entry of the person, in order to perform the action, into the building or the part of the building via the entrance securable with respect to unauthorised entry, determining the beginning of a duration of stay of the person in the building or part of the building based at least on providing access authorisation information to allow entry of the person in order to perform the action into the building or the part of the building via the entrance securable with respect to unauthorised entry, checking whether the person, in order to perform the action, stayed in the building or part of the building for less or no longer than a predefined duration;

receiving information representative of a reason why the predefined duration has elapsed and/or the predefined region was left.

2. A method performed by at least one apparatus, wherein the at least one apparatus is or comprises a server or a part thereof, the method comprising:

receiving, from a mobile device of a person, a request for access authorisation information to allow entry of the person, in order to perform an action, into a building or a part of the building via an entrance securable with respect to unauthorised entry, wherein the building or the part of the building is accessible via the entrance securable with respect to unauthorised entry, the person being a delivery agent and the action to be performed is to deliver or collect a shipment or delivery;

providing, to the mobile device of the person, access authorisation information to allow entry of the person, in order to perform the action, into the building or the part of the building via the entrance securable with respect to unauthorised entry, determining the beginning of a duration of stay of the person in the building or part of the building based at least on providing access authorisation information to allow entry of the person in order to perform the action into the building or the part of the building via the entrance securable with respect to unauthorised entry, checking whether the person, in order to perform the action, stayed in the building or part of the building for less or no longer than a predefined duration;

providing information representative of a reason why the predefined duration has elapsed and/or the predefined region was left.

3. A method performed by at least one apparatus, wherein the at least one apparatus is or comprises a server or a part thereof, the method comprising:

receiving, from a mobile device of a person, a request for access authorisation information to allow entry of the person, in order to perform an action, into a building or a part of the building via an entrance securable with respect to unauthorised entry, wherein the building or the part of the building is accessible via the entrance securable with respect to unauthorised entry, the person being a delivery agent and the action to be performed is to deliver or collect a shipment or delivery;

providing, to the mobile device of the person, access authorisation information to allow entry of the person, in order to perform the action, into the building or the part of the building via the entrance securable with respect to unauthorised entry, determining the beginning of a duration of stay of the person in the building or part of the building based at least on providing access authorisation information to allow entry of the person in order to perform the action into the building or the part of the building via the entrance securable with respect to unauthorised entry, checking whether the person, in order to perform the action, stayed in the building or part of the building for less or no longer than a predefined duration, determining the predefined duration based on action-specific information in relation to the respective action to be performed and/or based on empirical values in relation to actions already performed.

4. The method according to claim 3, the method further comprising:

receiving position information representative of the position of the person;

checking the plausibility of the received position information representative of the position of the person and the requested access authorisation information.

5. The method according to claim 3, wherein the method further comprises:

receiving information indicative of a successful unlocking of the entrance securable with respect to unauthorised entry;

determining the beginning of a duration of stay of the person in the building or part of the building based at least on receiving information indicative of a successful unlocking of the entrance securable with respect to unauthorised entry.

6. The method according to claim 3, wherein the method further comprises:

providing information indicative of the beginning of the action to be performed when the access authorisation information to allow entry of the person in order to perform the action into the building or the part of the building via the entrance securable with respect to unauthorised entry was provided or when the information indicative of a successful unlocking of the entrance securable with respect to unauthorised entry was received.

7. The method according to claim 3, the method further comprising:

checking whether the predefined duration has elapsed; and/or checking whether the action was performed successfully.

8. The method according to claim 3, the method further comprising:

receiving a notification that the person stayed in the building or part of the building for not less or longer than a predefined duration and/or did not only stay in the predefined region of the building or part of the building.

9. The method according to claim 3, the method further comprising:

receiving information concerning an entry of the person into the building or the part of the building from an intruder alarm system; and/or providing information concerning the authorisation of an entry of the person into the building or the part of the building to an intruder alarm system.

10. An apparatus, configured to carry out or comprising means to carry out the method according to claim 3.

11. A system comprising:

one or a plurality of apparatuses configured to carry out or comprising means to carry out the method according to claim 3.

12. A non-transitory, machine readable medium, comprising:

program instructions to perform the method according to claim 3, when the program is executed on a processor.

* * * * *